(12) United States Patent
Olson

(10) Patent No.: US 8,301,999 B2
(45) Date of Patent: Oct. 30, 2012

(54) METHODS, SYSTEMS, AND COMPUTER PROGRAM PRODUCTS FOR NAVIGATING CONTENT

(75) Inventor: Peter Jonathan Olson, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 813 days.

(21) Appl. No.: 11/527,095

(22) Filed: Sep. 25, 2006

(65) Prior Publication Data

US 2008/0077857 A1    Mar. 27, 2008

(51) Int. Cl.
*G06F 17/00* (2006.01)
(52) U.S. Cl. .................. 715/246; 715/273; 345/473
(58) Field of Classification Search ................ 715/246, 715/273; 345/473
See application file for complete search history.

(56) References Cited

U.S. PATENT DOCUMENTS

| | | | |
|---|---|---|---|
| 5,669,006 A * | 9/1997 | Joskowicz et al. ............ | 715/202 |
| 5,682,511 A | 10/1997 | Sposato et al. | |
| 5,790,122 A | 8/1998 | Cecchini et al. | |
| 6,069,622 A * | 5/2000 | Kurlander ..................... | 715/753 |
| 6,232,966 B1 | 5/2001 | Kurlander | |
| 6,460,036 B1 | 10/2002 | Herz | |
| 6,622,306 B1 * | 9/2003 | Kamada ........................ | 725/109 |
| 6,771,284 B1 | 8/2004 | Anderson et al. | |
| 6,918,090 B2 * | 7/2005 | Hesmer et al. ................ | 715/760 |
| 6,937,241 B2 | 8/2005 | Minagawa et al. | |
| 7,191,398 B2 | 3/2007 | Nitta et al. | |
| 7,325,192 B1 | 1/2008 | Bialek et al. | |
| 7,823,058 B2 * | 10/2010 | Pea et al. ...................... | 715/230 |
| 2002/0122039 A1 * | 9/2002 | Minagawa et al. ........... | 345/473 |
| 2004/0021673 A1 * | 2/2004 | Alessi et al. .................. | 345/619 |
| 2004/0025034 A1 | 2/2004 | Alessi et al. | |
| 2005/0013493 A1 * | 1/2005 | Onno et al. ................... | 382/232 |
| 2005/0039138 A1 * | 2/2005 | Urbina .......................... | 715/802 |
| 2005/0071743 A1 | 3/2005 | Harrington et al. | |
| 2005/0190280 A1 * | 9/2005 | Haas et al. ............... | 348/333.05 |
| 2007/0101263 A1 * | 5/2007 | Bedingfield .................. | 715/526 |
| 2008/0039163 A1 | 2/2008 | Eronen et al. | |
| 2008/0059481 A1 | 3/2008 | Kunimatsu et al. | |
| 2008/0077857 A1 | 3/2008 | Olson | |
| 2009/0034800 A1 * | 2/2009 | Vau et al. ..................... | 382/107 |

FOREIGN PATENT DOCUMENTS

EP        1237124 A2    9/2002

(Continued)

OTHER PUBLICATIONS phpGrabComics (http://web.archive.org/web/20060617213315/http://phpgrabcomics.org/overview.php).*

(Continued)

*Primary Examiner* — Adam M Queler
(74) *Attorney, Agent, or Firm* — Fish & Richardson P.C.

(57) ABSTRACT

Methods, systems, and computer program products which enhance the use of digitized content by users are described. The methods, systems, and computer program products include causing portions of the content to be adjusted in size according to dimensions which would best facilitate electronic review of the content. The methods, systems, and computer program products include preparing illustrated content for navigation, specifying dimensions for areas within content collections such as pages and orders for viewing the areas, and correlating the specified dimensions and the specified order with instructions for rendering an enhanced view of the content areas. In some embodiments, the illustrated content comprises a digitized comic book.

11 Claims, 23 Drawing Sheets

FOREIGN PATENT DOCUMENTS

| KR | 2031481 A | | 5/2002 |
|---|---|---|---|
| WO | WO 01/44915 A2 | | 6/2001 |
| WO | WO 2005/055085 A1 | | 6/2005 |
| WO | WO 2005055085 A1 | * | 6/2005 |
| WO | WO 2006056311 A1 | * | 6/2006 |

OTHER PUBLICATIONS

Office action dated Feb. 3, 2009 received in U.S. Appl. No. 12/196,153.

Casares, J., Cross, K., Klein, A., Polyviou, S., and Yocum, D. 2001. Redesigning traditional media and assessing entertainment value with online comics. In CHI '01 Extended Abstracts on Human Factors in Computing Systems (Seattle, Washington, Mar. 31-Apr. 5, 2001). CHI '01. ACM, New York, NY, 427-728. Available at <http://portal.acm.org/citation.cfm?id=634316>.

Lisa Purvis, Steven Harrington, Barry O'Sullivan, and Eugene C. Freuder. "Creating personalized documents: an optimization approach," Proceedings of the 2003 ACM Symposium on Document Engineering. DocEng'03, Nov. 20-22, 2003, Grenoble, France.

Roto, V., Popescu, A., Koivisto, A., and Vartiainen, E. 2006. "Minimap: a web page visualization method for mobile phones." In Proceedings of the SIGCHI Conference on Human Factors in Computing Systems (Montréal, Québec, Canada, Apr. 22-27, 2006). CHI '06. ACM, New York, NY, 35-44.

Steven R. Bagley, David F. Brailsford, and Matthew R. B. Hardy. "Creating reusable well-structured PDF as a sequence of component object graphic (COG) elements." Proceedings of the ACM Symposium on Document Engineering. DocEng'03, Nov. 20-22, 2003, Grenoble, France.

"Synchronized Multimedia Integration Language (SMIL) 1.0 Specification." W3C Recommendation, Jun. 15, 1998. Available at <http://www.w3.org/TR/1998/REC-smil-19980615>.

Xiaofan Lin, Hui Chao, Greg Nelson, and Elsa Durante. "Active Document Versioning: from layout understanding to adjustment." Imaging Systems Laboratory, HP Laboratories, Palo Alto, HPL-2005-186, Oct. 17, 2005. Available at <http://citeseerx.ist.psu.edu/viewdoc/summary?doi=10.1.1.86.9017>.

* cited by examiner

1006

METHODS, SYSTEMS, AND COMPUTER PROGRAM PRODUCTS FOR NAVIGATING CONTENT

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

REFERENCE TO COMPUTER PROGRAM LISTING APPENDIX

A Computer Program Listing Appendix is submitted herewith on a single compact disc, the files of which are incorporated herein by reference. The compact disc is submitted in duplicate. The filename, date, and size for the files submitted on each compact disc include:

as-frame1.pdf, 30 Aug. 2006, 22 KB;
as-inits.pdf, 30 Aug. 2006, 8 KB;
as-loaders.pdf, 30 Aug. 2006, 17 KB;
normal_page_init.pdf, 30 Aug. 2006, 6 KB;
normal_page_loader.pdf, 30 Aug. 2006, 14 KB;
normal_page_start.pdf, 30 Aug. 2006, 6 KB;
scrollbar-controller.pdf, 30 Aug. 2006, 10 KB;
single_page_init.pdf, 30 August 2006, 6 KB;
single_page_loader.pdf, 30 Aug. 2006, 10 KB;
single_page_mode_controller.pdf, 30 Aug. 2006, 15 KB;
smartpanel-activation.pdf, 30 Aug. 2006, 16 KB;
spreadholder-calculator.pdf, 30 Aug. 2006, 7 KB; and
spread-mover.pdf, 30 Aug. 2006, 8 KB.

FIELD OF INVENTION

The present invention relates generally to methods and systems for distributing digital content in a communications system. More particularly, the present invention relates to methods and systems for navigating through digitized content arranged sequentially in specified shapes, such as panels of digitized comic books.

BACKGROUND OF THE INVENTION

Publishers of content traditionally offered on paper have begun to digitize the content for distribution over the Internet. For example, publishers of comic strips, comic books, and graphic novels, have begun digitizing their current and classic stories into graphical image formats that can be displayed by software programs. The digitized content is then stored in a repository or on a web server and made available to users to download at their convenience. Alternatively, some digitized comic books are being offered as collections for purchase on DVD or similar format, for perusal on personal computers or through other devices capable of reading and playing DVDs. Thus, all those comic books thrown out by parents when cleaning out their garages are resurrected in digital form in much the same way that the superheroes featured in them frequently and easily return from their apparent demises.

When a comic book or similar illustrated content is digitized, each page or double page spread can be stored as a single image such as a .gif file or .tiff file. A person wishing to read the digitized comic uses a software program that can process and render such images, and reads the pages one at a time. One drawback from such an approach is that illustrated works such as comics often contain tremendous detail and color in the drawings as well as small text which may be difficult to see, much less appreciate, without dramatically enlarging the image through the software program processing the image.

One way to enlarge the image of, for example, a comic book page, is to modify the scale, zoom or similar setting in the image reader, if there is such an option, which on some display devices there is not, until a desired portion of a page is sufficiently large to allow for viewing all the interesting details. However, a reader would then need to continuously scale or zoom in and out from the page to see an entire panel of a comic book page or to read other portions or panels of the page. The reader would also be required to scroll up/down or left/right until the next portion or panel of the page is properly positioned on the reader's screen. This is made particularly difficult because the size, shape and positioning of panels on a comic book page vary from page to page, at the whim of the illustrator. The need for the reader to continuously adjust and re-adjust the software settings and scroll around the page reduces the overall enjoyment of reading the content in digitized form.

In addition, for comic books and similar works in which action is illustrated in or across a sequence of panels in particular, part of the enjoyment is being able to peruse a page in several different ways. For example, a reader may want to scan the action occurring through the page to follow the overall flow, and then return and analyze each panel in more detail, to appreciate the artistry of the illustration and reflect on the action with a more considered eye. The reader may also want to return to prior pages to recall action or details or even to scan ahead to later pages to see where the story is headed. The need to constantly re-adjust scaling settings while reading a digitized comic book significantly reduces the enjoyment of the digitized work as compared to the paper format.

Accordingly, it is desirable to provide methods and software-related tools to improve the ability of a reader to navigate through the digitized content such as comic books which are arranged in a sequence of illustrated shapes.

BRIEF SUMMARY OF THE INVENTION

As described herein, the present invention relates to methods, systems, and computer program products that enhance the use of digitized content by users of the content by causing portions of the content to be adjusted in size according to dimensions which would best facilitate electronic review of the content. Mechanisms and/or techniques are provided for preparing the content for user review according to the invention, and additional mechanisms and/or techniques are provided for enabling user access to the prepared content in accordance with the invention. The portions may be in the form of panels, as in a comic book, or in different shapes and sizes in their original form, and may be adjusted to varying sizes so as to permit a more detailed and enjoyable view by users of the content. For instance, panels of content may be scaled up in size when selected by a user so that the panel becomes larger to enable easier viewing of the details of the content. The instant invention may be used in any client machine capable of displaying digitized content, such as personal computers and cell phones.

In one aspect of the present invention, a computerized method for preparing illustrated content for navigation is provided including receiving an image of a page of the content, wherein the image comprises a plurality of areas within the page, specifying dimensions for a first area within the page, specifying an order for viewing the first area with respect to one or more other areas within the page, and correlating the specified dimensions and the specified order with instructions for rendering an enhanced view of the first area such that the enhanced area view is visually distinguished from the one or more other areas on the page.

In another aspect of the invention, the specified dimensions, the specified order, and the instructions for rendering an enhanced view are saved, in some instances in the form of a PHP file, database, or other online storage media. In other aspects of the invention, the instructions for rendering include instructions for enlarging the view of a specified area within the page.

In yet another aspect of the invention, dimensions for a second area within the page are specified, as may be an order for viewing the second area with respect to one or more other areas within the page. Further still, the specified dimensions for a second area and the specified order for viewing the second area are correlated with instructions for rendering an enhanced view of the area such that the enhanced area is visually distinguished from other areas on the page. In addition, an image of a second page from the comic may be received, wherein the image comprises a plurality of areas within the second page. Dimensions for an area within the second page may be specified, as well as an order for viewing the area with respect to other areas within the second page.

In some embodiments, the illustrated content comprises a digitized comic book.

In other aspects of the invention, a computerized method for presenting on a display screen content arranged in a plurality of pages each having a sequence of panels is provided. In this aspect, a user is allowed to select between a first viewing mode and a second viewing mode. In the first viewing mode, a first page of content is displayed so that it is visible in its entirety on a display screen without visually distinguishing panels on the first page from one another. In the second viewing mode, one or more of the panels are displayed on the first page in a manner visually different than one or more other panels on the first page, and users may be allowed to navigate from one group of panels to another in the first page according to the sequence on the first page by sequentially displaying each group in the visually different manner. In some cases, displaying the one or more panels in an enhanced manner comprises displaying the one or more panels in an enlarged view relative to other panels on the first page.

In yet another embodiment, a computerized method for presenting a page of content arranged in a sequence of panels of arbitrary size and shape is provided, including retrieving presentation data identifying dimension data for groups of one or more panels in the page of content and a specified order for the groups, and upon receipt of a user request, displaying the page of content with a visual focus on a first of the groups of panels that makes the first group more readily perceived than the other groups, with the first group being identified by the dimension data, and further, displaying a next group of panels according to the specified order following the first group with the visual focus that makes the next group more readily perceived than the other groups including the first group, with the next group being identified by the dimension data. In some instances, the page of content may be a digitized comic book page. In still other cases, the page may be displayed with the first group in an enlarged state compared to the other group or groups in the page. In yet further embodiments, a navigational indicator maybe displayed in association with the first group to indicate that the user may navigate to the next group of one or more panels on the first page or on another page. Navigational indicators may be displayed in association with the first or next group to indicate that the user may navigate to a prior group of one or more panels on the first page or another page.

The above described and many other features of the present invention will become apparent, as the invention becomes better understood by reference to the following detailed description when considered in conjunction with the accompanying drawings.

BRIEF DESCRIPTION OF THE DRAWINGS

The invention is illustrated in the figures of the accompanying drawings, which are meant to be exemplary and not limiting, in which like reference numbers indicate identical or functionally similar elements, additionally in which the leftmost digit(s) of a reference number identifies the drawing in which the reference number first appears, and in which.

DETAILED DESCRIPTION OF PREFERRED EMBODIMENTS

In the following description of embodiments of the invention, reference is made to the accompanying drawings that form a part hereof and in which is shown by way of illustration a number of specific embodiments in which the invention can be practiced. It is to be understood that other embodiments can be utilized and structural changes can be made without departing from the scope of the present invention.

Methods, systems, computer program products are described herein for enabling navigation through portions of digital content on a computerized device. For purposes of illustration, the inventions are discussed herein with reference to digital content in the form of comic books, but it should be understood that the inventions are in no way limited to comic books but can be implemented with any digital content arranged in specified shapes and intended for viewing in a sequential order.

As most people are well aware, comic books and related content such as graphic novels, comic albums, and comic strips, include a sequence of illustrated content in distinct portions or panels depicting a narrative. Examples of comics sold by the present assignee, Marvel Entertainment, Inc., include editions featuring Spider-Man, the Fantastic Four, Captain America, the Avengers, and the like. Each content panel may contain illustration, drawn by hand or perhaps with the aid of a computer, and/or text in the form of a speech balloon or caption. Comics created originally on paper may be converted into an electronic format for distribution via electronic means, such as over the Internet or on DVD, by scanning the individual pages of content in a high-quality scanner. Alternatively, a comic may be digitized upon creation, such as on a computer using a computer graphics program.

In some embodiments, a collection of digital content (representing a specific story, episode, lesson, or the like) is accessed over a communications network such as the Internet and displayed on a graphical user interface (GUI) coupled to a communications device. The methods, systems, and computer program products of the present invention facilitate the navigation of a collection of content panels, a singular panel, or a portion of a panel, in a predefined order or in an order determined by the user, with minimal effort from a user.

Figure 1:
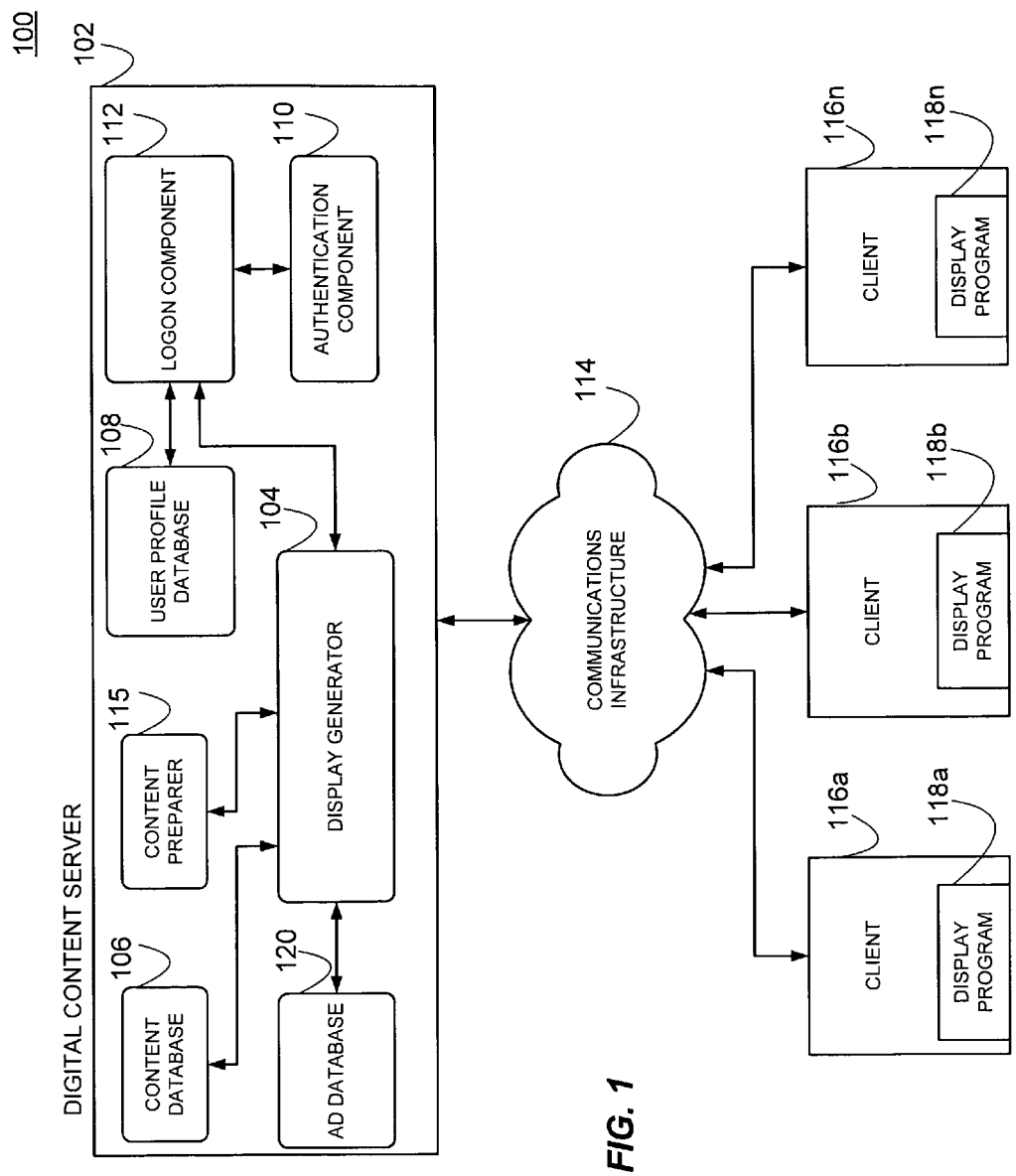
FIG. 1 illustrates a digital content navigation system according to an embodiment of the present invention.

FIG. 1 illustrates a digital content navigation system 100 according to an embodiment of the present invention. System 100 includes at least one digital content server 102 that is communicatively coupled to one or more communications clients 116a-116n by communications infrastructure 114. The digital content server 102 may provide users with any form of digital content arranged in portions intended for viewing in a sequential order. Such content may include graphic narratives of a variety of sorts, such as comic books, television episodes, movies, or the like. It should be understood that the system 100, as described herein, is an exemplary system for implementing various aspects of the present invention. Various modifications can be made without departing from the scope of the present invention. For example, the quantity of system components illustrated in FIG. 1 can be increased or decreased as desired by the system architect.

Digital content server 102 and clients 116a-116n comprise network interface hardware and/or software that allow each component to transmit and receive data and/or messages over communications infrastructure 114. Communications infrastructure 114 can be a wired and/or wireless local area network (LAN), virtual LAN (VLAN), wide area network (WAN), and/or metropolitan area network (MAN), such as an organization's intranet, a local internet, the global-based Internet (including the World Wide Web (WWW)), an extranet, a virtual private network (VPN), licensed wireless telecommunications spectrum for digital cell (including CDMA, TDMA, GSM, EDGE, GPRS, CDMA2000, WCDMA FDD and/or TDD or TD-SCDMA technologies), or the like. Communications infrastructure 114 can support wired, wireless, or combinations of both transmission media, including satellite, terrestrial (e.g., fiber optic, copper, UTP, STP, coaxial, hybrid fiber-coaxial (HFC), or the like), radio, free-space optics, microwave, and/or any other form or method of transmission.

Digital content server 102 and clients 116a-116n can be configured to support the standard Internet Protocol (IP) developed to govern communications over public and private Internet networks. The protocol is defined in Internet Standard (STD) 5, Request for Comments (RFC) 791 (Internet Architecture Board). The components can also support transport protocols, such as Transmission Control Protocol (TCP), User Datagram Protocol (UDP), Real Time Transport Protocol (RTP), or Resource Reservation Protocol (RSVP). The transport protocols support various types of data transmission standards, such as File Transfer Protocol (FTP), Hypertext Transfer Protocol (HTTP), Simple Network Management Protocol (SNMP), Network Time Protocol (NTP), or the like. Digital content may also be transmitted to users in stores or through the mails, on storage media such as CDs, DVDs, floppy disks, or the like.

The content (e.g., digitized comic book) exchanged among digital content server 102 and clients 116a- 116n can be formatted to support HyperText Markup Language (HTML), Handheld Device Markup Language (HDML), Synchronized Multimedia Integration Language (SMIL), Extensible Markup Language (XML), ALLAIRE® Cold Fusion, APPLE WEB OBJECTS®, HAHT SITE®, PHP, AESTIVA® scripting languages; or the like. In an embodiment, content can be formatted to support GIF for graphics, JPEG for photographs, APPLE® QUICKTIME® for dynamic media (e.g., audio and video), MACROMEDIA® FLASH™ for simple animation, MACROMEDIA® SHOCKWAVE™ for more advanced animation, ADOBE® ACROBA™ for documentation, or the like.

Clients 116a-116n can be represented by a variety of devices, such as, personal computers, personal digital assistants, smart phones, cell phones, portable media players, or the like. Clients 116a- 116n can include one or more output mechanisms that output information to the user. Such output mechanisms may include a monitor, an LCD screen, a printer, a speaker, or the like. One or more input mechanisms can be included to permit a user to input information to the clients 116a-116n. Such input mechanisms may include a keyboard, a mouse, a stylus, touch pad, voice recognition mechanisms, biometric mechanisms, or the like.

Clients 116a-116n can include client software such as resident applications and web browser applications. An exemplary web browser application is the MICROSOFT® INTERNET EXPLORER® browser application. In an embodiment, a client 116a-116n sends an HTTP request to the digital content server 102 to access an HTTP object (e.g., a digitized comic book) using the TCP/IP and HTTP protocols. The HTTP object may be stored and formatted as a web page or a PHP document. As a PHP document, the object includes plain text (ASCII) written in PHP with embedded hyperlinks or URLs that may point to other web documents, including graphics (e.g., GIF, SFW, JPEG, TIFF), audio (e.g., MPEG, MP3, WMA), video (e.g., MPEG, WMV, MJPEG), multimedia (e.g., AVI, ASF, WAV, MP4), or the like. As discussed above, other protocols and formats can be used in addition to or in lieu of the herein mentioned TCP/IP, HTTP, XML, GIF, MP3, WMV, ASF, etc. For example, an initial request for a web object may result in an XML document being returned to the requesting client 116-116n. The XML document may include hyperlinks to one or more PHP documents, whereupon activation of one of the hyperlinks would result in a PHP document being returned.

Digital content server 102 responds to an HTTP request from a client 116a-116n by sending the requested HTTP object (e.g., the digitized comic book) to the requesting client 116a-16n. The HTTP object may be formatted as, for example, a PHP document. The web browser, operating at the requesting client 116a-116n, with a display program 118a-118n (discussed in greater detail below), displays the PHP document on a display coupled to the client so that a user may interact with the PHP document and activate any embedded hyperlinks to other web documents.

As illustrated in FIG. 1, the digital content server 102 includes the following components: a display generator 104, a content preparer 1 15, and a content database 106. The digital content server 102 may optionally include an advertisement database 120, a user profile database 108, an authentication component 110, and a logon component 112. Any one or more of the foregoing components may optionally reside on a client 116a-116n or in a separate location from the other components.

The digital content server 102 receives and processes user requests from clients 116a-116n for access to content database 106. In response to the user request (which may but need not require authorization), the display generator 104 distributes or makes accessible a display program 118a-118n that enables display and/or viewing of the digital content. In one embodiment, display generator 104 is a software application that can be written in one of a plurality of programming languages, including, for example, C, C++, JAVA, Active-X, or the like. In an example using JAVA, a JAVA servlet can be created to perform the functions of display generator 104.

In an embodiment, the display program 118a-118n is downloaded to a web browser application as a plug-in, applet, or similar mechanism. The plug-in, for example, can be pre-installed or obtained from the digital content server 102 or from a third party, disk, tape, network, CD-ROM, or the like. In another embodiment, the display program 118a-118n is a client resident software application operating at clients 116a-116n. In yet another embodiment, the display program 118a-118n may reside in the digital content server 102, or in the same location as the digital content server 102, and may be accessed through the communications infrastructure 114 by the clients 116a-116n. The display program 118a-118n can be integrated with a browser application for sending HTTP requests to digital content server 102. Further discussion of the operations and functions of the display program 118a-118n is described in greater detail below.

The content database 106 stores and/or provides access to a plurality of digital content, such as the digital comics available from Marvel Entertainment, Inc. As such, the content database 106 comprises a plurality of content that can be requested and forwarded to a requesting client 116a-116n. The content database 106 can be commercially available software, such as the database applications available from Oracle Corporation. Various classification schemes and criteria can be employed to categorize and classify the content of content database 106. In some embodiments, such criteria may optionally include issue numbers, family identifiers, teaser quantities, subdirectories, legacy links, and/or display identifiers. Issue number may be used to track a particular item of content, such as a comic, in a content series. Family identifiers may indicate whether the content is related to a family of content, for example, a comic series pertaining to Spider-Man and a comic series pertaining to Spider-Girl may be considered as members of the same family of comics. A teaser quantity (described in greater detail below) may be used for promotional purposes and enables a portion of a comic to be viewed based on user authorization. Subdirectory points to a storage location of the content or a portion thereof. Legacy link enables a user to specify a particular link (e.g., URL) for accessing the content. A display identifier specifies links to a display table containing supporting PHP documents for the comic, such as graphics, titles, soliciting texts, or the like. Additional examples of methods for creating and storing the data structure for a comic, in accordance with embodiments of the present invention, are described in greater detail below. In some embodiments, content within the content database 106 may be organized into collections, such as discrete stories or episodes, as in multiple pages containing multiple panels, and may be further organized or separated into distinct pages containing one or more panels of content. Any collection of panels, whether as in a page of a comic book, or a single panel, may be stored as a PHP document within content database 106.

Content in the content database 106 is obtained after being prepared by a content preparer 115. The content preparer 115 can be written in any of a plurality of programming languages, including, for example, C, C++, or JAVA, Active-X, or the like. The content preparer 115 prepares content to be accessed and used by the display generator 104. In some embodiments, the content preparer 115 will be used with previously generated content, or content that was originally generated in another form or for another purpose, such as content that previously appeared in a printed publication such as a comic book, or a television cartoon. In other embodiments, the content preparer. 115 will be used with content being created contemporaneously with the preparation of the content for the display program 118a-118n.

In one embodiment, a pre-existing comic book is selected by a user of the content preparer 115 for preparation. Upon selection, in some embodiments, a link to other pre-specified information in a database, which may be the content database 106, will be created, including information such as title, author, etc. In addition, properties of the digital content being prepared can be selected, such as whether the content is related to other digital content in the database 106, or specification of the number of teaser spreads. The foregoing and other like information and properties may be specified at selection of the digital content for preparation or at a later time.

In some embodiments, the digital content being prepared, which may be saved as a file, may be of a specified pixel size in accordance with the particular user interface being used to display the content. By way of example, the specific display size for use with a particular client (e.g., a personal computer or a cell phone) is specified in the content preparer 115. A user using the content preparer 115 may select the specific display size in which the content is intended to be displayed, and the content preparer 115 generates a drawing area of the specified display size. For exemplary purposes only, content preparer 115 may specify personal computer display size of 500×800 pixels. A user of the content preparer 115 selects the personal computer display size, and content preparer 115 then generates an image of the same size in which the user may set or define the specific frames. Thus, the content preparer 115 is programmed to permit portions of content to be designated or framed within the limits of a display of the specified size. In some embodiments, content framed for display in one specific client can be adjusted proportionally to be displayed in a client of another size so that a user does not have to re-set frames for the same content for all possible client types. In other embodiments, it might be desirable to specifically adjust frame sizes based on the client type and possible display limitations therein.

Coloring and lettering of pre-existing content may be converted using scripts for commercial software such as Adobe Photoshop and Adobe Illustrator. In some embodiments, use of specified filenames will facilitate recognition by the content preparer 115 of the files for which specific preparation is desired.

In an example, using the content preparer 115, the comic book will be categorized in a data structure by page identifier, issue identifier, order number, double indicator, advertisement indicator, color path, and letter path. The page identifier specifies the page number of a particular page in a larger collection, such as a page in a comic book. The issue identifier specifies the issue number for the comic book, as discussed above. Order number can be initially specified as being the filename for the comic book, but would change as the page is moved. Another indicator, which may be a double indicator, specifies whether the page, or other collection of content, is intended to be viewed alongside or with another page or collection of content, such as where a particular comic page is part of a two-page spread within the comic book. An advertisement indicator specifies whether the page includes an advertisement. A color file contains the file name of the color file. A letter file contains the name of the letter file.

In some embodiments, each page of a comic includes one or more panels representing a sequence of a narrative. In accordance with embodiments of the present invention, using the content preparer 115, areas of content, or frames, are specified to enable such area, which in some cases comprises one or more panels from a particular page of a comic book to be accessed and displayed on a requesting client 116a-116n in accordance with the invention. In an embodiment, as further explained below, a frame comprises an alternate view, such as a more detailed or enlarged view, of a portion of an individual panel, an entire panel, or a combination of panels (in whole or portions thereof. Frames are selected, using the content preparer 115, by using computer input tools to draw the parameters of the frame. In one embodiment, a display area is selected, as discussed above, for a particular content display client. A user of the content preparer 115 is then provided with a interface screen for specifying the areas or frames within the display area to designate. In some embodiments, the user may click on the display area which will cause a predefined shape, such as a rectangle to be drawn. The rectangle may be "dragged" using a mouse or similar input device in horizontal, vertical or diagonal directions to increase, decrease or alter the shape or size of the rectangle. When the user has obtained the desired size, the user releases the mouse and saves the shape as a new frame. Other means may be used for specifying the frame, such as by specifying screen or image coordinates for selection. The content preparer 115 is used to categorize the frames by a various criteria, which may include panel identifier, issue identifier, page identifier, panel-x coordinate, panel-y coordinate, start panel indicator, end panel indicator, panel-z coordinate, panel x-scale coordinate, panel y-scale coordinate, and successor panel indicator. A panel identifier is a character that uniquely identifies a particular frame (e.g., one or more panels, or portions thereof). An issue identifier, as discussed above, specifies the issue number for the comic book containing the frame. A page identifier, as discussed above, specifies the page number within the comic book containing the frame. A panel-x coordinate specifies the location of the frame by reference to the horizontal position of the top-left corner of the frame. A panel-y coordinate specifies the location of the frame by reference to the vertical position of top-left corner of the frame. A start panel indicator designates the frame as being the first frame in the frame sequence on a particular comic page. An end panel indicator designates the frame as being the final frame in the sequence of a particular content collection (e.g., comic, page). A panel-z coordinate specifies a z-index used to denote overlapping frames. A panel x-scale coordinate specifies the pixel width of the frame. A panel y-scale coordinate specifies the pixel height of the frame. A successor panel indicator designates the frame as being an intermediate frame within the sequence on a particular page where the frame is neither the start frame nor the end frame. Additional examples of methods for creating and storing data structures for a digital content panels or frames, in accordance with embodiments of the present invention, are described in greater detail below.

An optional advertisement database 120 is configured to store advertisements for products and services which advertisements may be displayed with the digital content. Advertisements can be displayed in a pop-up, banner, slider, or other types of presentations. An advertisement can be randomly generated by a server application program without user interaction on a periodic basis and forwarded to a client 116a-116n for rendering. Alternatively, the advertisement can be presented as a hyperlink (e.g., icon or text) pointing to a page that can be displayed when the link is selected by the user.

In some embodiments, an advertisement indicator is used to designate a content frame or collection of frames as including one or more advertisements. In an embodiment, the advertisement page is a PHP document with one or more embedded links (e.g., URLs) to a storage location containing graphics, audio, video, multimedia, or the like, for presenting an advertisement. At advertisement database 120, an advertisement page is categorized in a data structure with various criteria, such as by an advertisement identifier, active designator, start date indicator, end date indicator, source file, advertisement count, advertisement link, and priority status. An advertisement identifier indicates a character that distinguishes the advertisement page from other pages within the comic. An active designator marks the advertisement as being active or inactive. A start date indicator specifies a start date for serving the advertisement. An end date indicator specifies an end date for serving the advertisement. A source file indicates a filename for the advertisement page. An advertisement count tracks the number of times an advertisement page is requested and/or viewed at a requesting client 116a-116n. An advertisement link indicates the storage location of the graphics (e.g., GIF, SFW, JPEG, TIFF), audio (e.g., MPEG, MP3, WMA), video (e.g., MPEG, WMV, MJPEG), multimedia (e.g., AVI, ASF, WAV, MP4), or like content for presenting the advertisement on the advertisement page. A priority status sets the frequency or probability of serving the advertisement to a client 116a-116n. Additional examples of methods for creating and storing the data structure for an advertisement page within digital content, such as a comic, in accordance with embodiments of the present invention, are described in greater detail below.

The digital content server 102 may optionally maintain user properties for subscriber of system 100 in a user profile database 108. User properties can include various details regarding a subscriber, for example, subscriber identification, password used to log on, user group, age, other demographic information, or the like.

An optional authentication component 110 and logon component 112 are operative to authenticate the identity of users requesting access to view content from the content database 106. In one embodiment, the logon component 112 receives a logon request (e.g., a username and/or password) from a user using a client 116a-116n and interacts with the authentication component 110 to thereby authenticate the user. The logon component 112 accesses a profile for the given user that the user profile database 108 maintains. The logon component 112 forwards the user profile to the authentication component 110. The authentication component 110 includes rules and/or policies that are executed to compare information identifying the user (e.g., the username and/or password) against information (e.g., the user profile) contained in the user profile database 108. The authentication component 110 ensures that the user identifying information (e.g., username and password) matches the stored user profile data. Based on the polices of the authentication component 110, the level of access to the content database 106 that is granted to a given user depends on whether the logon component 112 has authenticated the user.

Figure 2:
FIG. 2 illustrates a user interface for selecting content according to an embodiment of the present invention.

FIG. 2 illustrates a user interface 200 for selecting digital content, in this case a comic, according to an embodiment of the present invention. User interface 200 displays a plurality of comics that are available at the digital content server 102. In one embodiment, a browser application operating on a client 116a-116n issues an HTTP request, and, in response, the digital content server 102 forwards a script that is executed to produce user interface 200. As discussed, user interface 200 can be formatted in XML, PHP, HTML, HDML, or any other type of computer language suitable for processing by the browser application. User interface 200 comprises hyperlinks pointing to comic files stored in the content database 106. The hyperlinks can be presented in a variety of ways, including as thumbnails 204a-204n or text 210. Thumbnails 204a-204n provide a graphical depiction of the associated content, and text 210 provides a description of the associated content. The user can select the hyperlinks, for example, by moving a pointing device, such as a mouse, to position a cursor over the hyperlink and pressing a button. User interface 200 includes scroll buttons 206a-206b to allow the user to display additional thumbnails 204a-204n that are hyperlinked to content selections not visible on user interface 200. The user interface may function and may be designed in any number of ways and the description here is not intended to be nor should be construed as limiting the invention in any manner.

Figure 3:
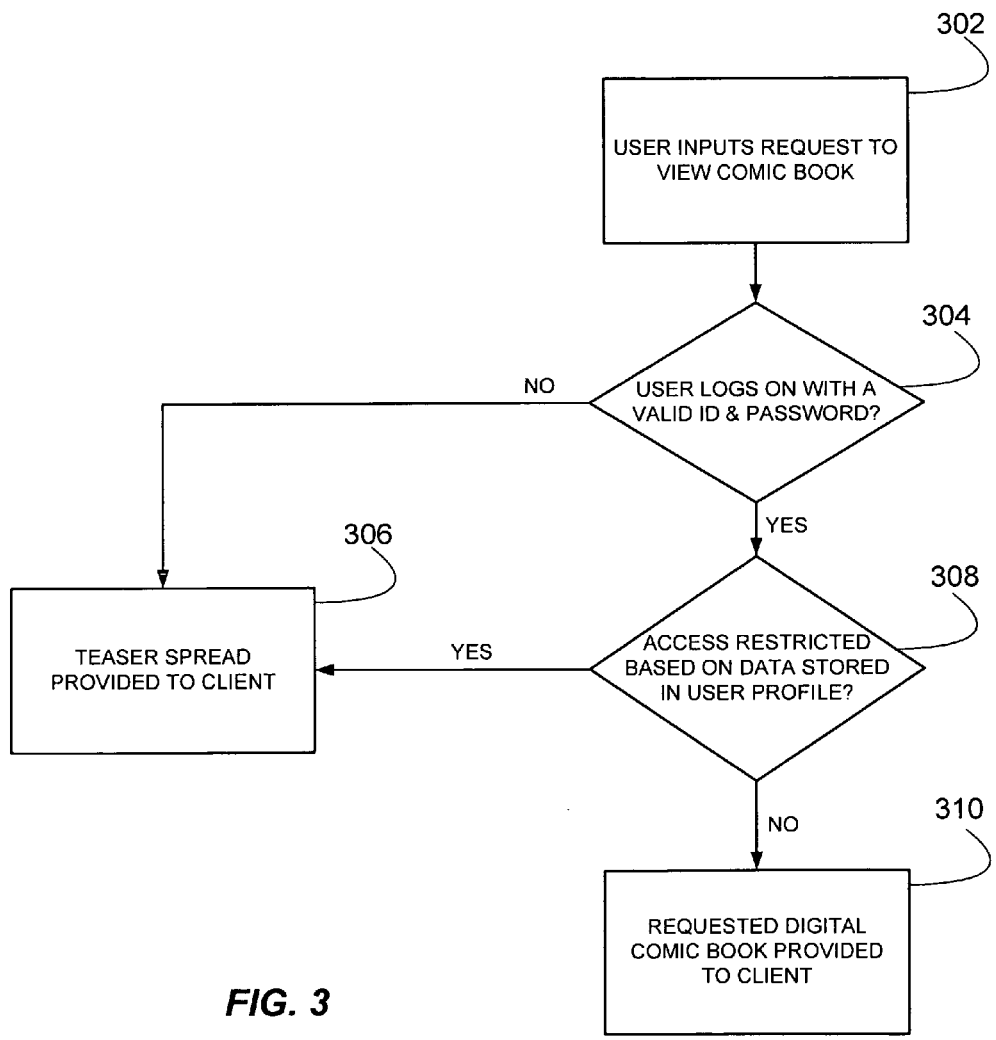
FIG. 3 illustrates a control flow for accessing digital content from a digital content server according to an embodiment of the present invention.

Referring to FIG. 3, flowchart 300 illustrates a control flow for accessing digital content from a digital content server, such as the digital content server 102, according to an embodiment of the present invention. Flowchart 300 is described with reference the user interface 200 of FIG. 2, by way of example. Beginning at step 302, upon user input requesting to view content, a browser generates a request to display the requested content and sends the request to the digital content server 102. For example, a browser request is made upon selection of a comic hyperlink (e.g., a thumbnail 204a-204n or text 210) by a user as described above. At step 304, the digital content server 102 optionally determines if the user has logged on using a valid user identification and password pair. More specifically, the digital content server 102 consults the logon component 112 to determine if the user has been authenticated. In some embodiments, if the user is not authenticated, the digital content server 102 provides a teaser spread or preview of the selected content to the client 116a-116n at step 306. As discussed above, a content item or collection can be associated with a teaser quantity that enables a portion of the content to be viewed based on user authorization. Thus, in some embodiments, a user may be permitted to view some, but not all, portions of the content, such as part of a promotional campaign or the like. For example, a user who selects a specific comic book without a valid username/password pair may be provided access to the first few pages of the comic book, but not the entire comic book. In a similar manner, a user may be provided with access to any portion of digital content, but not the entirety of available content, based on the user's authorization status. When a user views the last portion of the teaser quantity, the digital content server 102 notifies the user that additional content is available, or that further access is denied, when or until the user logs onto the system with a valid username and password, or other authorization requirements are fulfilled.

At step 308, if the user has been authenticated, the digital content server 102 may optionally check to determine whether the user properties meet the requirements of the distribution parameters stored in the content database 106 for the selected comic. Potential distribution parameters include parental controls (such as age restrictions), subscriber group policies, or the like. If the user properties are consistent with those required by the distribution parameters, the complete comic is forwarded to the client 116a-116n for rendering at step 310. If the user properties are not qualified then the digital content server 102 will forward the teaser spread as described above at step 306. For example, if a subscriber of subscription package A attempts to access a comic exclusive to subscription package B, the digital content server 102 determines that the user group for the subscriber stored in the user profile database 108 does not match the distribution parameters of the comic file, and then retrieves and forwards a teaser spread to the subscriber instead of the complete comic. If access to the digital content is not restricted, digital content server 102 provides the requested digital content to the client 310.

When the digital content server 102 provides either complete content, such as a complete comic book at step 310 or one or more portions of content, such as a teaser spread at 306, the content is accessed with a display program 118a-118n, which enables the display and navigation of the panels of the selected comic according to the inventions. The display program 118a-118n may be executed in conjunction with a browser application executing on the client 116a-116n. As described above, the display program 118a-118n can be a plug-in, applet or similar mechanism, or other independent software program. Portions of exemplary software code for the display program 118a-118n are located in the Computer Program Listing Appendix, and incorporated herein by reference.

Figure 4:
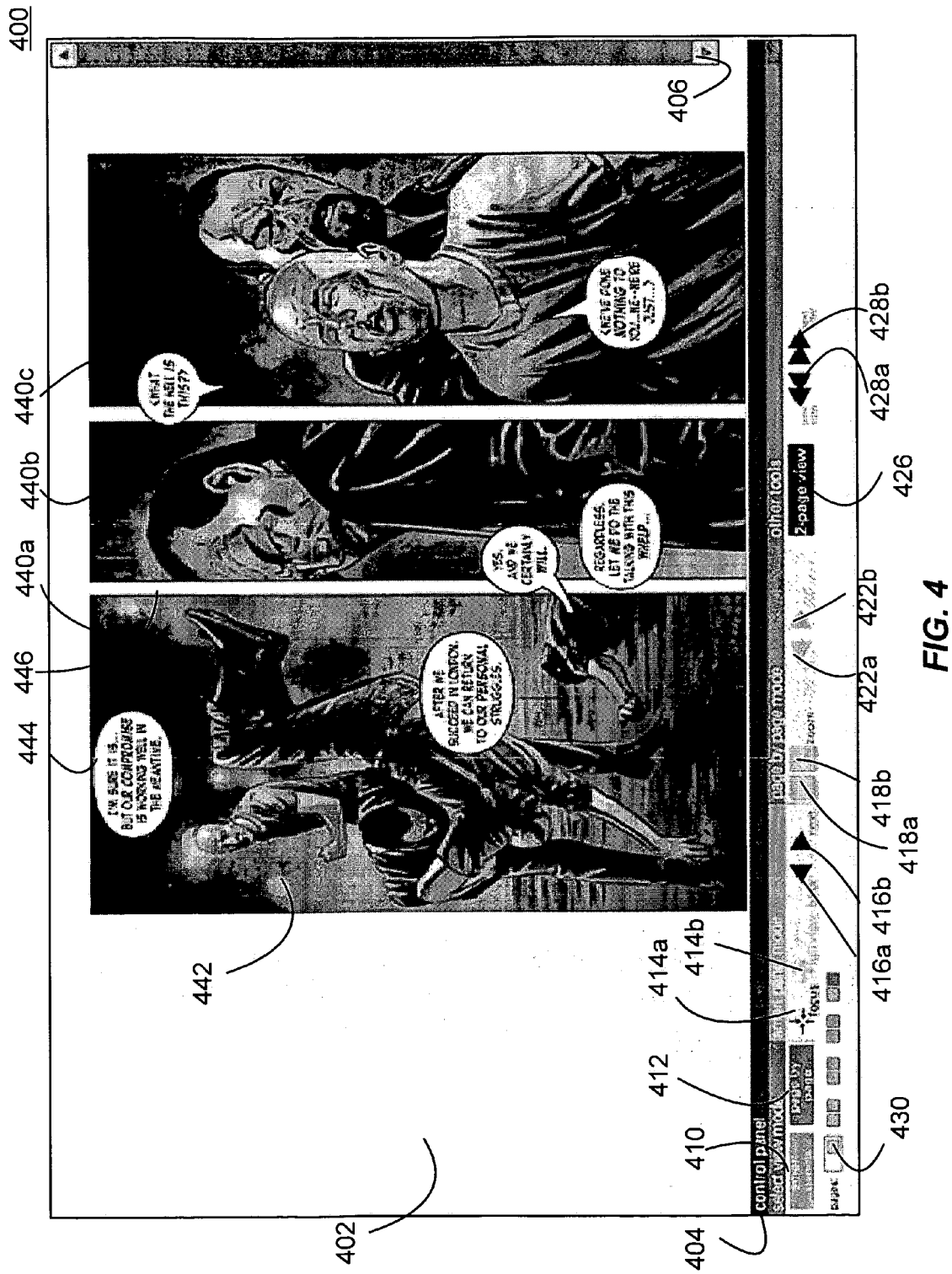
FIG. 4 illustrates a viewer interface for permitting users to navigate digital content according to an embodiment of the present invention.

FIG. 4 illustrates an embodiment of a viewer interface 400 that is produced by the display program 118a-118n. In this embodiment, the viewer interface 400 is divided into two main sections: (1) a viewer window 402 comprising a scroll bar 406 which is capable of scrolling up and down to allow a user to view the entire page that is presented in the window 402 and (2) a control panel 404 comprising a plurality of buttons for navigating the digital content. In FIG. 4, a three-panel page is displayed in the viewer window 402 corresponding to a selected comic. In the example, each panel 440a-440c of digital content contains a background 442 and a frame 446. The spoken words or the thoughts of the characters featured in panels 440a-440c are displayed in a bounded area called a balloon 444. Although FIG. 4 illustrates comic panels 440a-440c that are rectangular and of equal size, the digital content can be of types other than comics, and of different shapes and/or sizes, as may be preferred by the content provider or system architect for example. It should be understood that description in FIG. 4 is provided by way of example, and not limitation. The instant invention can be used with any content capable of arrangement in discrete sections that can be viewed in a sequential order. Therefore, the content of panels 440a-440c can be modified without departing from the spirit and scope of the present invention.

The display illustrated in FIG. 4 can be manipulated by selecting one of the navigational control buttons from the control panel 404. In the example, a user actuates the navigational control buttons by manipulating a mouse or other input mechanism which may be coupled to the client 116a-116n in order to click on a button. In the described embodiment, the control panel 404 enables two navigational modes for the digital content 440a-440n. The navigational modes include an enhanced view mode and a page mode. To view the content in the enhanced view mode, a user selects button 410, and for the page view mode, user selects button 412. Users may also jump to different pages directly by selecting a specific page of interest from the page indicators 430.

When the enhanced view mode is selected, the viewer window 402 presents an enhanced or alternate view of an individual panel 404a-404c, a portion thereof, or a combination of panels 404a-404c. In some embodiments, the display continues with one enhanced, for instance, enlarged, view at a time in a sequential order until interrupted by a user action. When the page mode is activated, the viewer window 402 presents an image of a plurality of panels 404a-404c as they would appear on a scanned image of a page from a comic in printed form, or a page of a digital comic.

In some embodiments, when the enhanced view mode button 410 (shown as "smart panel mode") is selected, the user can begin navigating a sequence of content panels 440a-440c by selecting the Next button 416b located on the smart panel mode portion of the control panel 404. In response, the viewer window 402 presents one of the enhanced, or focused, views of panels 440a-440c, such as panel 1100 shown in FIG. 11. Each time the Next button 416b is selected, the viewer window 402 displays the next enhanced panel view of panels 440a-440c in a predetermined sequence, without the user selecting which panel to view next in the enhanced view mode. In other embodiments, the user can select specific panels to view in an order of the user's choosing. Exemplary software code for enabling the selection and navigation of panels is illustrated in the Computer Program Listing Appendix hereto, which is incorporated by reference herein.

In some embodiments, a user may select a Back 416a button to navigate through the sequence of panels 440a-440c in reverse order. If the user desires to further enlarge a panel view panel (e.g., zoom in), the user can select the Focus button 414a. To zoom out of the panel display, the user selects the Full View button 414b.

Figure 11:
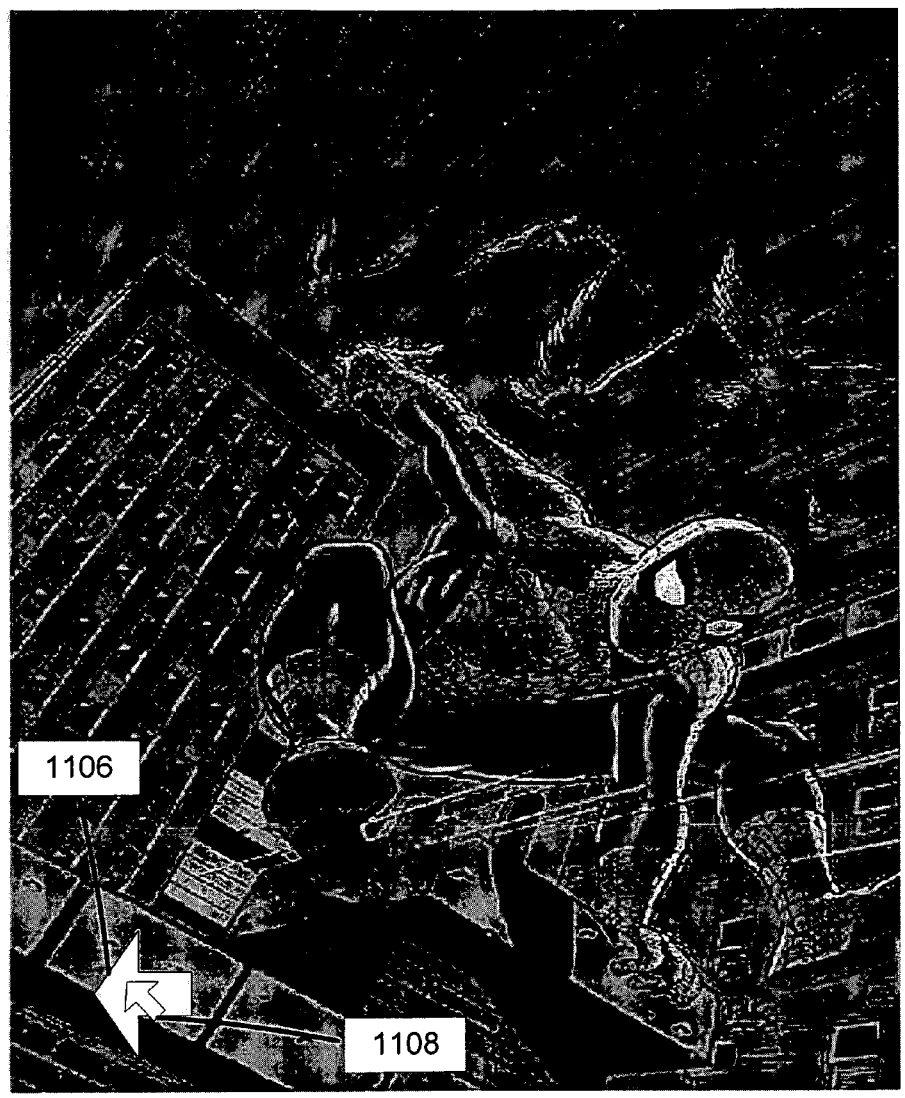
FIG. 11 illustrates digital content displayed in an enhanced view mode according to an embodiment of the present invention.

In one embodiment, viewer window 402 provides a second method of navigating the series of panels 440a-440c when operating in the enhanced view mode. By clicking directly on a specific panel 440a-440c appearing in the viewer window 402, the user can advance to the next panel 440a-440c in the series in the same way the user would if he selected the Next button 416b described above. FIG. 11 illustrates a panel 1100 in enhanced view mode. A user interacts with the panel 1100 by positioning a cursor 1108 or other location indicator over the panel 1100. In response, a blinking arrow 1106 appears on the panel 1100 to signal the direction of the next enhanced view of the panels of the sequence (e.g., panels 440a-440c). Alternatively, the user can click anywhere on the content image to move to the next enhanced view.

When the page mode button 412 has been selected, the user can navigate a page view of one or more content panels 440a-440c as they might appear on a scanned page of a paper copy of a comic, or a page of a digital comic by selecting the Next button 422b located on the page mode (shown as "page by page mode") frame of the control panel 404. In response, the viewer window 402 would present an image of the next page of panels 440a-440c. Each time the Next button 422b is actuated, the viewer window 402 displays the next page of panels 440a-440c.

To display a previously viewed page of panels 440a-440c, the user clicks on the Back button 422a to navigate in reverse order. To zoom in further to a rendered page, the user can select the Zoom button 418a. To zoom out, the user selects the Zoom button 418b.

Figure 12:
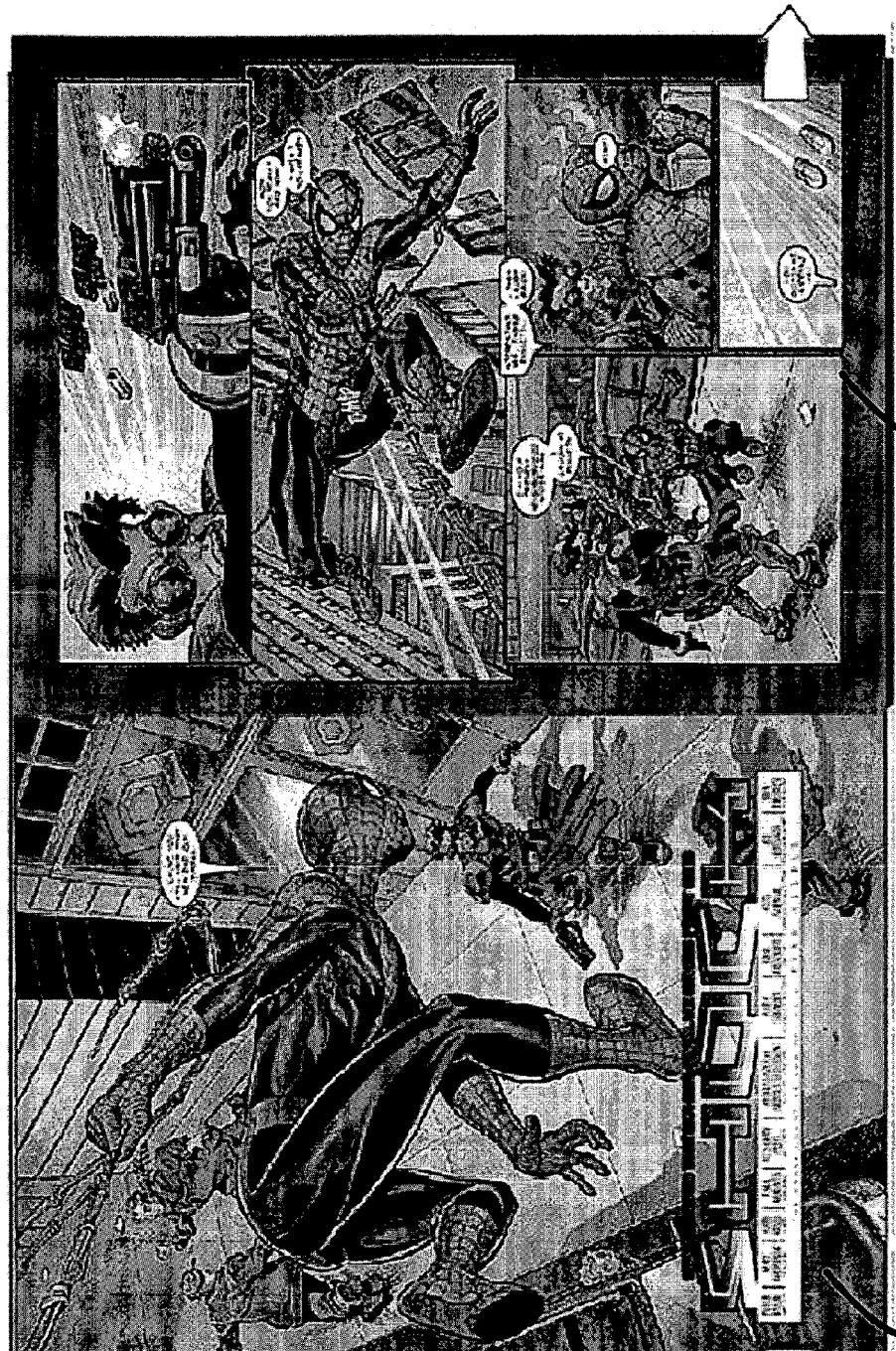
FIG. 12 illustrates a viewer interface depicting two pages of digital content in a page mode according to an embodiment of the present invention.

Two-page mode button 426 enables two pages of panels 440a-440c to be displayed in the viewer window 402, when the page mode is in use. When the two-page mode button 426 is selected, the viewer window 402 presents two pages as they would appear in a scanned image of a paper copy of a comic, or a page of a digital comic. Selecting previous view button 428a and next view button 428b allows the user to navigate to a previous or next, respectively, selection of pages. FIG. 12 illustrates an example of a viewer interface 1200 depicting two pages (page 1202 and page 1204) of digital content in page mode.

Figure 5:
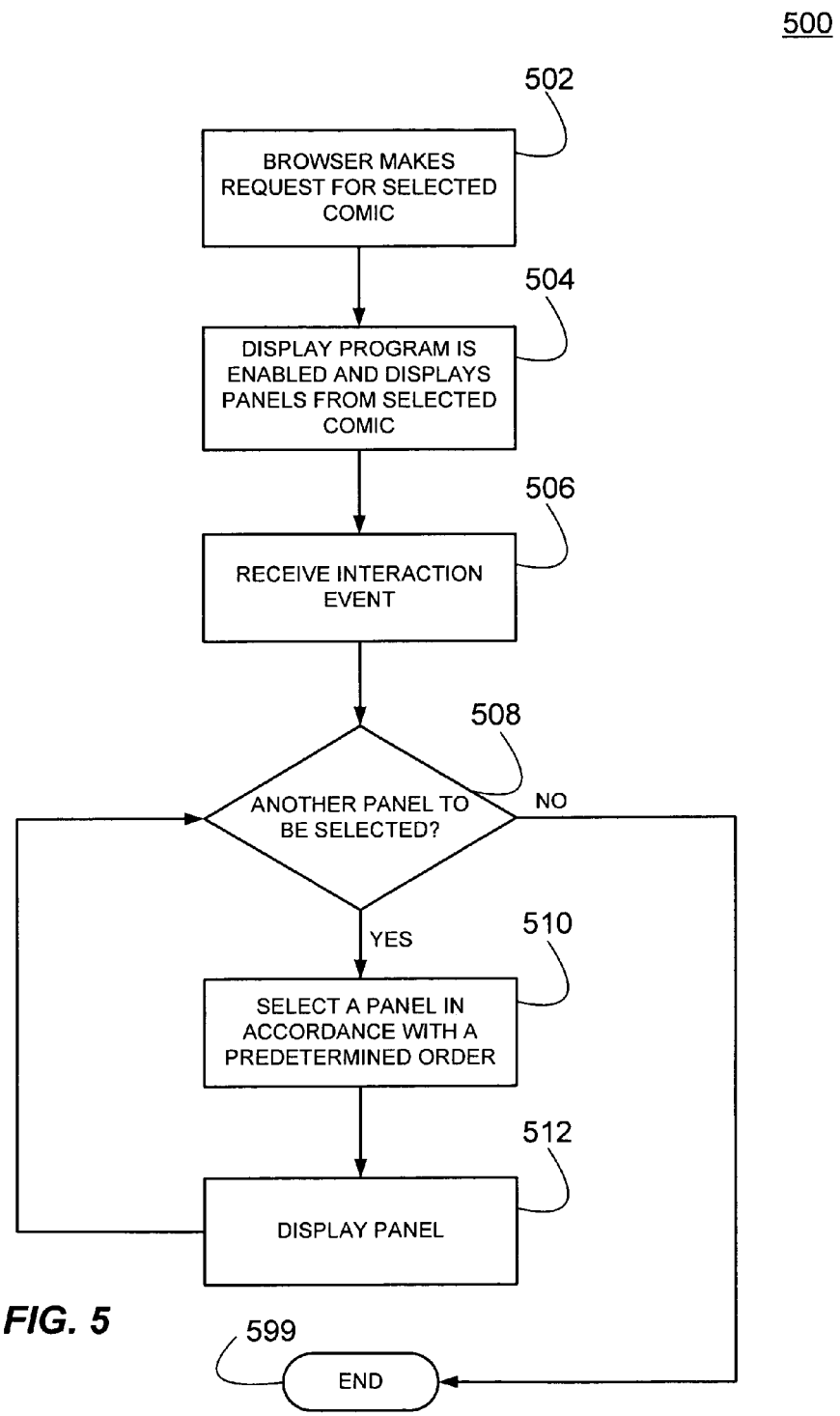
FIG. 5 illustrates a control flow for navigating a series of digital content according to an embodiment of the present invention.

Referring to FIG. 5, flowchart 500 illustrates a control flow for navigating digital content in enhanced view mode. At step 502, upon selection of a comic by the user, a browser application generates a request to display the selected comic and sends the request to the digital content server 102. The digital content server 102 provides a display program 118a-118n that is executed to generate a graphical user interface (e.g., viewer interface 400) that is displayed by the browser application providing the user with multiple methods of browsing the requested digital content. It should be understood that a browser is not required to carry out the inventions, but other display software or mechanisms may be used. A graphical user interface (e.g., viewer interface 400) is employed by the user to receive, or download, the digital content from the digital content server 102 and displays the panels from the comic files at the client 116a-116n, at step 504. For example, the browser application displays a web page containing the digital content by interpreting the PHP documents comprising the digital content prepared by the content preparer 115, which results in the showing of the digital content in a display coupled to the requesting client 116a-116n.

At step 506, the user actuates one of the navigational control buttons (e.g., buttons 416a, 416b) for the enhanced view mode to display an enhanced view of the content, to change the display (e.g., zoom level) of the enhanced view, or the like interaction events. Although in some embodiments, a user selection prompts the enhanced view of specified panels, the enhanced view could also be effected by an application program without user interaction. For example, the digital content server 102, or the display program 118a-118n, could be configured to include a scheduler program component which generates a request to the browser to display enhanced views of the panels in a pre-specified manner, such as after a specified time period (e.g., one minute intervals). The scheduler program in this example may reference the system clock for the requesting client 116a-116n, and measure a predefined time period. The scheduler program may include its own timer, which is synchronized with the system clock, and computes a predefined time period. After the predefined time period has elapsed, the scheduler program would generate a request for the next enhanced view. The predefined time period may be set or adjusted by a user or a system administrator. Alternatively, the display program 118a-118n may be pre-set to default to a specific view mode absent user selection.

Next, the display program 118a-118n determines whether there is an enhanced view, or another enhanced view (for subsequent iterations), of a panel in the sequence or collection available for selection, at step 508. Upon detection that there are no enhanced views of the panels available for selection, the flow ends as indicated at step 599. On the other hand, if there is an enhanced view available for selection, the display program 118a-118n checks the predetermined sequential arrangement to determine which enhanced view of the panels within the sequence to display next, at step 510. Alternatively, the control panel 404 may be configured to include controls that allow a user to skip and/or select which enhanced view to display next. The display program 118a-118n then renders the enhanced view of the panels at step 512.

Figure 6:
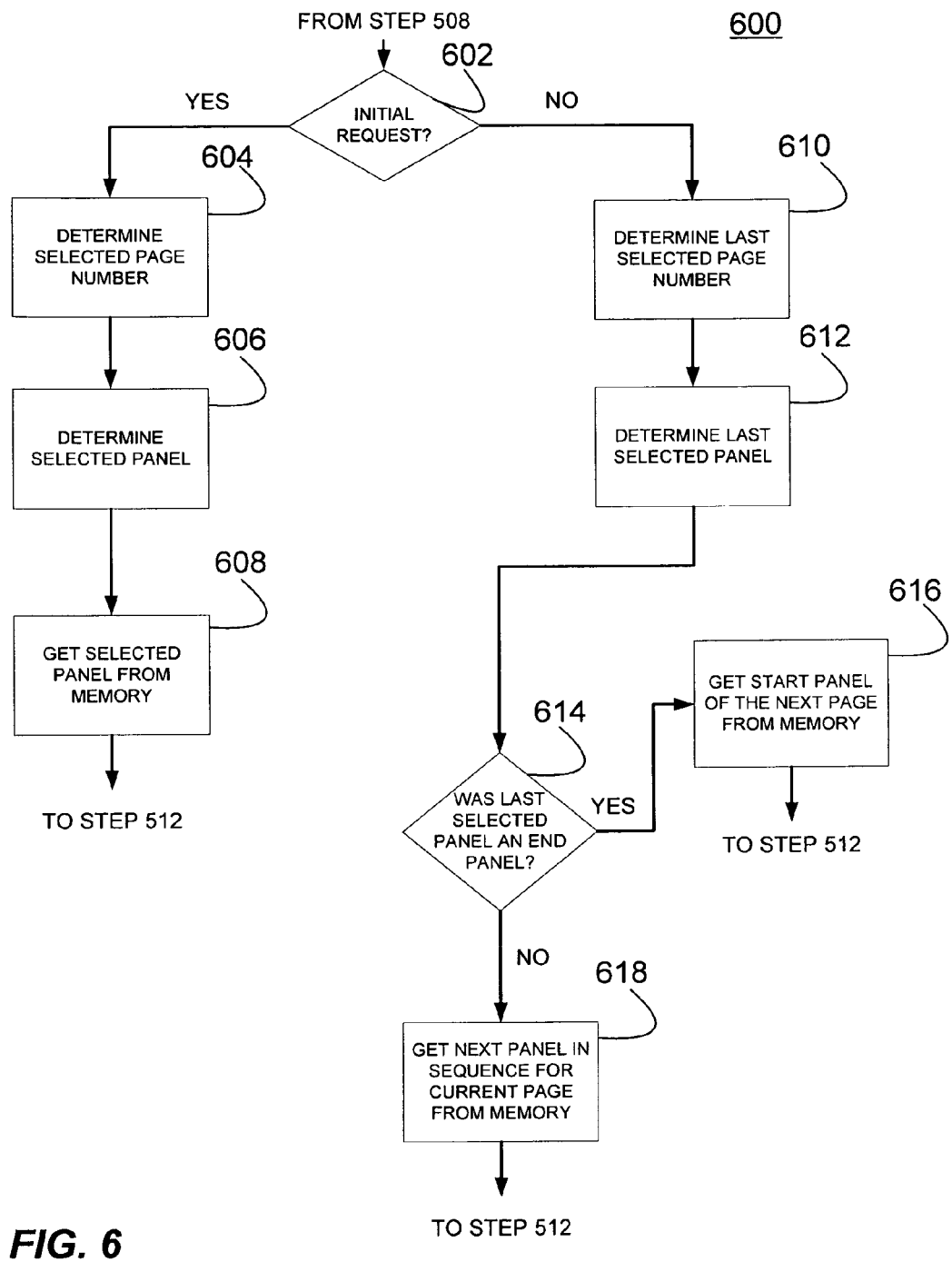
FIG. 6 illustrates a control flow for selecting a panel of digital content for an enhanced view in an enhanced view mode according to an embodiment of the present invention.

Referring to FIG. 6, an embodiment of step 510 is illustrated for selecting an enhanced view of a panel according to a predetermined order. Once the display program 118a-118n has received a request to display the next panel, display program 118a-118n begins the process of retrieving a panel view display from memory. Beginning at step 602, the display program 118a-118n determines whether the request received is the initial request. If the request received is the initial request, the display program 118a-118n will determine the selected page number of the panel, at step 604.

Next, the display program 118a-118n determines which of the panels from the sequence to display for the selected page at step 606. At step 608, the display program 118a-118n retrieves the selected enhanced view of the panels from the content database 106, if it is not currently buffered at the client 116a-116n. After the display program 118a-118n has received the enhanced view of the panels, the flow passes to step 512 as described in FIG. 5.

If on the other hand, the request from the user is not an initial request at step 602, the display program 118a-118n determines the last selected page number, at step 610. Next, at step 612, the display program 118a-118n determines the last selected enhanced view of the panels. The display program 118a-118n determines if the last selected view of the panels is an end panel, at step 614. As discussed above, a start panel indicator, end panel indicator, or successor panel indicator can be specified to designate a frame as being the first frame, the final frame, or intermediate frame, respectively, within a sequence of frames within a particular set of digital content. In some embodiments, as described in greater detail below, a system administrator assigns a start panel, an intermediate panel, and/or an end panel for each of a set of panels of content, such as the panels of a page of a comic book. The display program 118a-118n reads the PHP code comprising each set of frames prepared by the content preparer 115, which includes metadata that links the end panel of one page to the start panel of the following page. If last selected view of a panel is an end panel, the display program 118a-118n retrieves the start panel of the next page from memory, at step 616.

If the last selected view of a panel is not an end panel, the display program 118a-118n retrieves the next enhanced view of the panels in the specified sequence on the current page from memory, at step 618. After the display program 118a-118n has retrieved the next enhanced view of the panels in the sequence at step 616 or 618, the flow passes to step 512.

Figure 7:
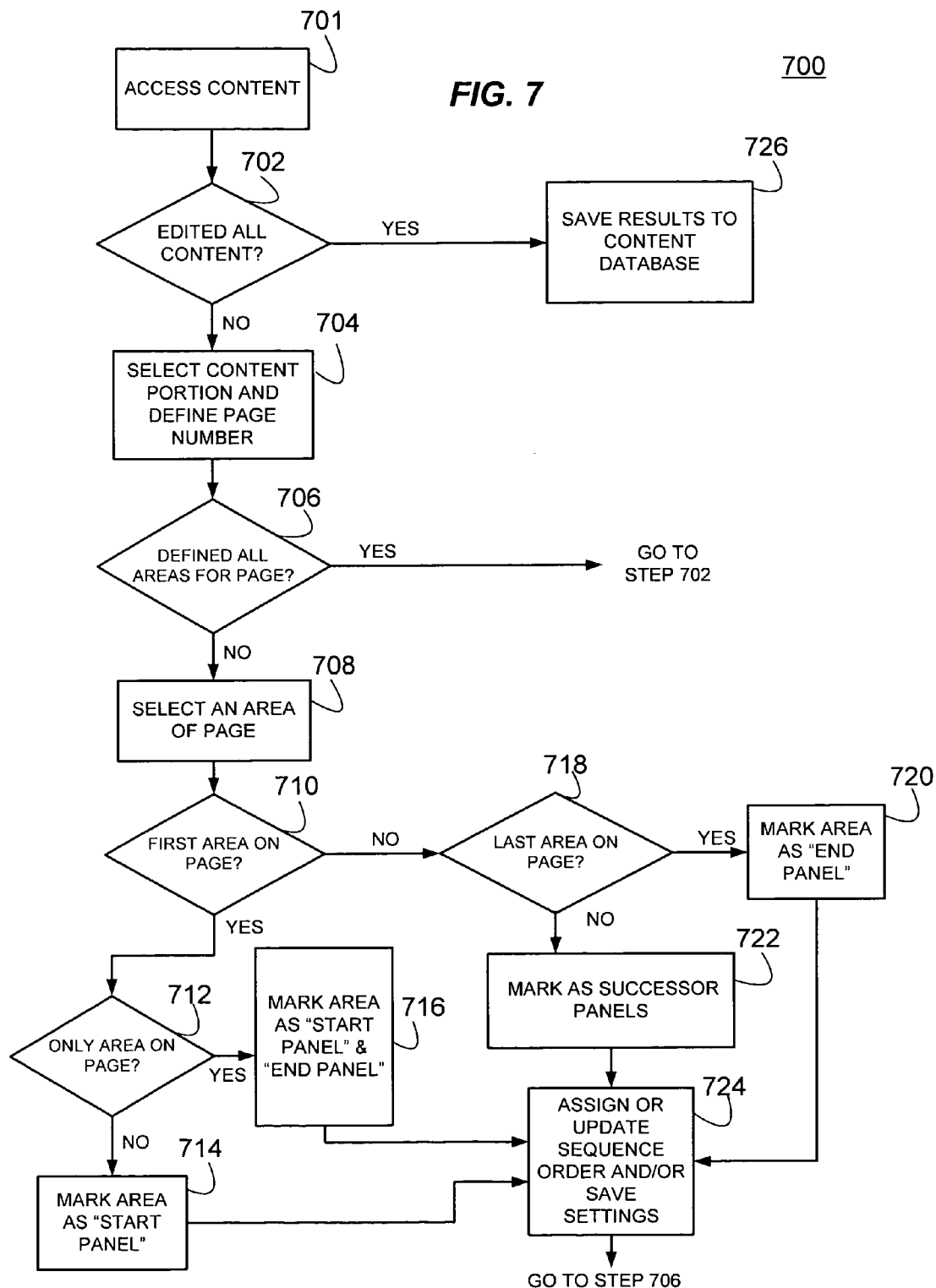
FIG. 7 illustrates a control flow for preparing a set of digital content for display in an enhanced view mode according to an embodiment of the present invention.

Referring to FIG. 7, flowchart 700 illustrates a control flow for preparing a set of digital content for display in enhanced view mode according to an embodiment of the present invention. In an embodiment, the control flow of flowchart 700 is implemented in content preparer 115. Content preparer 115 may reside and operate of a server, such as the digital content server 102 described above with reference to FIG. 1. However, the content preparer 115 may also reside and be executed on a separate computer system or on a client 116a-116n. Content preparer 115 is utilized by a system administrator to build the data structures (e.g., establish coordinates, parameters, etc.) that are deployed by the display program 118a-118n to navigate the digital content as discussed herein. The output of the content preparer 115 may be saved to the content database 106 and/or advertisement database 120, as appropriate, or to another storage facility, such as memory, for later use.

Referring back to FIG. 7, content is accessed at step 701 so that the content can be prepared, through reformatting and categorization, to be displayed in an enhanced view mode, as discussed above. The quantity of content is analyzed, and it is determined whether all content from the accessed content has been prepared for enhanced viewing at step 702. If it is detected that there is no additional content to be edited, or no changes to previously prepared content is desired, the results are saved to a content database 106 at step 726.

If there are additional content portions to prepare, a user (e.g., system administrator) of the content preparer 115 initializes the preparation process by inputting a request to define the content, which may be graphical image files, as individual pages. The page number for a selected page of content is stored at step 704. As discussed above, a page identifier can be saved to a data structure stored at the content database 106; the page identifier specifies the page number of the selected page. In response to the request to define the graphical image, the digital content server 102, for example, begins loading pages into the content database 106.

Figure 10:
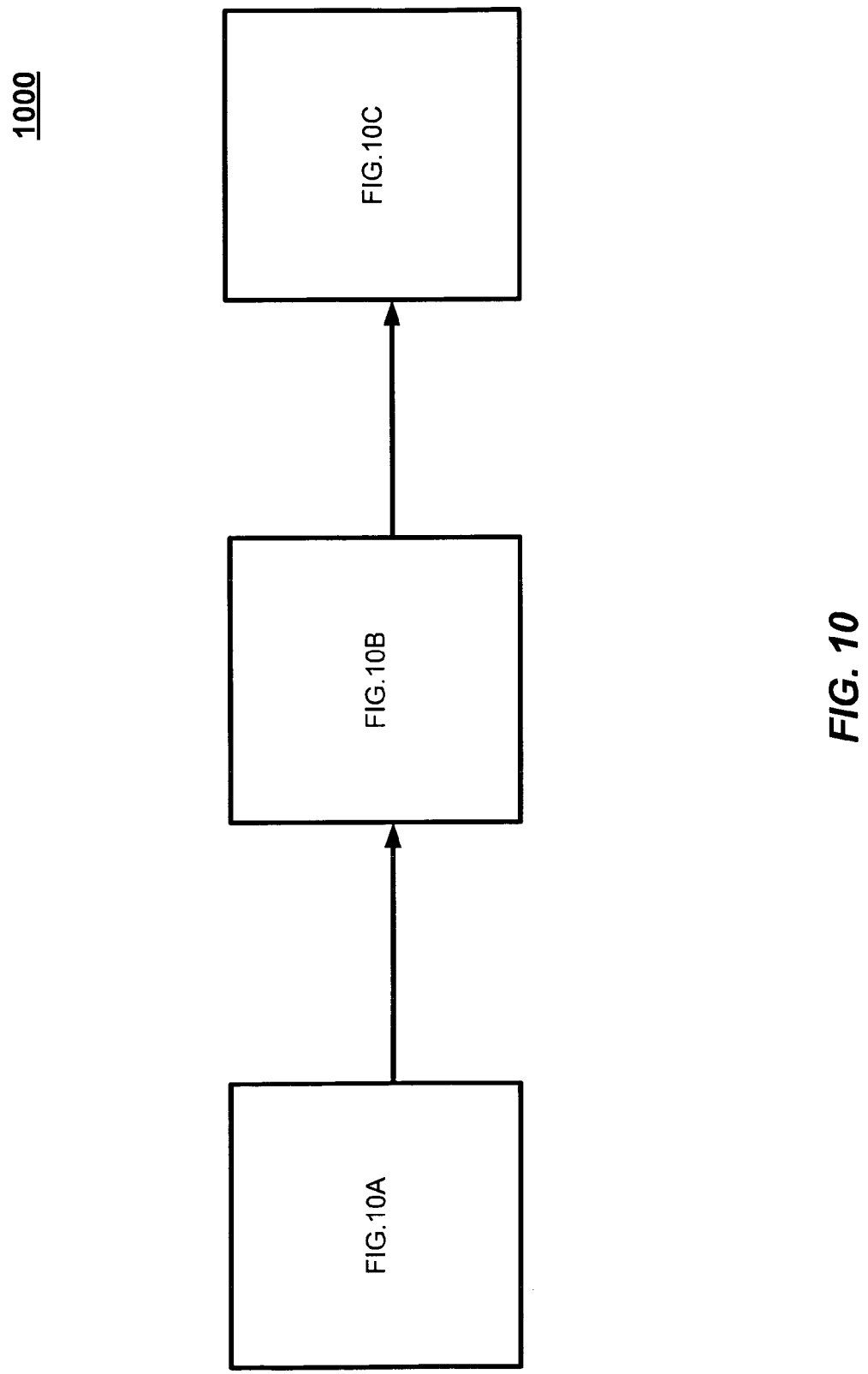
FIG. 10 illustrates a navigational flow of three enhanced areas of a single digital content page according to an embodiment of the present invention.
Figure 10A:
FIG. 10A illustrates a first enhanced area from the navigational flow of FIG. 10.
Figure 10B:
FIG. 10B illustrates a second enhanced area from the navigational flow of FIG. 10.
Figure 10C:
FIG. 10C illustrates a third enhanced area from the navigational flow of FIG. 10.

Once the pages have been loaded, the content can be divided into specific areas, or frames, as described above, which can be enhanced by the display program 118a-118n. This is explained generally with reference to FIGS. 10, 10A, 10B, and 10C, which illustrate an example of three enhanced areas or frames 1004, 1006, and 1008 (each representing an enhanced view) of comic page 1204 (shown in FIG. 12). Page 1204 may be referred to as a parent collection of content, in this case a comic book page containing multiple panels. In some embodiments, page 1204 can be generated from scanning or entering a pre-existing image (such as a page from a paper copy of a comic book), or alternatively, page 1204 can be created contemporaneously with the preparation of the page for the display program 118a-118n. Page 1204 includes a plurality of panels, each of which can be prepared or framed to be displayed as an enhanced area or a part of an enhanced area. Three enhanced areas 1004, 1006, and 1008 are shown in FIG. 10A, FIG. 10B, and FIG. 10C, respectively. Each enhanced area may be referred to as a child or frame of parent page 1204. As discussed above, frames may be designated in the content preparer 115 with the designations of start panel indicator, end panel indicator, or successor panel indicator, or other similar orienting designations to identify a particular frame with relation to other frames within a collection as being the first frame, second frame, or intermediate frame, etc. Other orienting designations may be used with respect to frames within a collection, such as designations relating to size or sound (e.g., largest frame, smallest frame, loudest frame, etc.). Enhanced area 1004 is the first frame from page 1204, and is designated as the start frame. Enhanced area 1008 is the last frame from page 1204, and is designated as the end frame. Enhanced area 1006 is a successor frame that falls between the start frame and the end frame.

With reference to FIG. 12 and FIG. 7 at step 706, if each area of a page of content has been defined or prepared as a frame to create the enhanced view area, the flow returns to step 702. On the other hand, if specific areas of the content have not been defined or framed, or if changes are desired in some embodiments, the system administrator proceeds to select an area (e.g., enhanced areas 1004, 1006, and 1008) of the page of content so that the selected area can be defined, step 708. The system administrator can define a page area by using a selection tool to specify the dimensions of the area. For example, the system administrator traces a straight-edged area on the page to thereby specify the dimensions of the enhanced area or frame. After defining the shapes for each frame, the dimensions are saved to the content database 106 or other storage facility for later recall. As discussed above, a data structure that includes the parameters and coordinates for each defined area is stored at content database 106 or other storage facility. For example, a panel-x coordinate can be stored to specify the location of the defined area (e.g., frame) by reference to the horizontal position of the top-left corner of the area. A panel-y coordinate can be stored to specify the location of the defined area by reference to the vertical position of top-left corner of the area. The panel-z coordinate specifies a z-index that is used to denote overlapping areas. The panel x-scale coordinate specifies the pixel width of the defined area. The panel y-scale coordinate specifies the pixel height of the defined area. The foregoing method is further described with reference to FIGS. 13, 14 and 14*a-f*.

Figure 13:
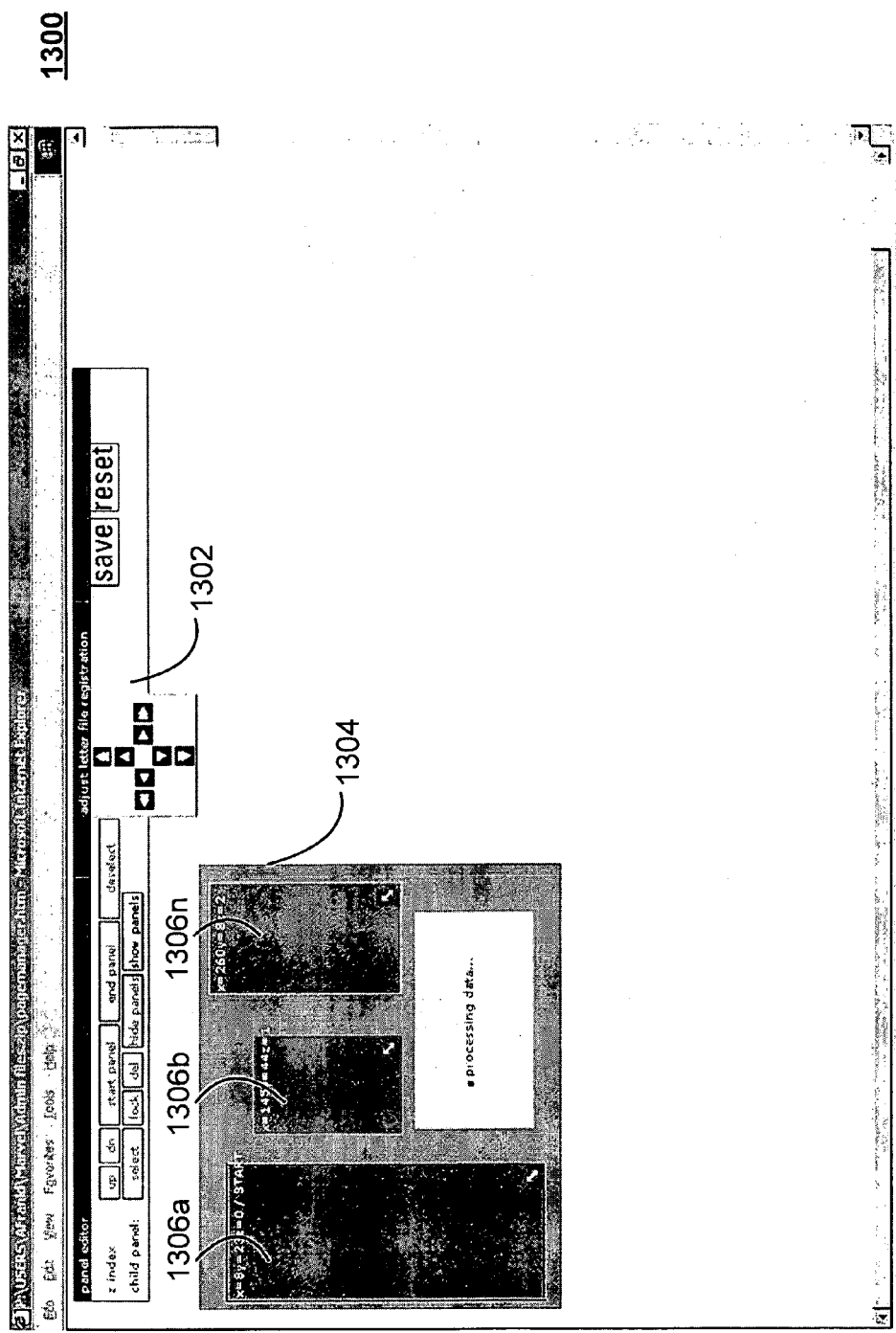
FIG. 13 illustrates a user interface for a content preparer according to an embodiment of the present invention.

FIG. 13 illustrates an embodiment of a user interface 1300 for a content preparer 115, wherein a user may select content for sizing. In the embodiment, the interface 1300 is referred to as a panel editor. In the panel editor tool bar 1302, options are provided for preparing panels, including designating panels as start or end panels. A grayed area beneath the tool bar comprises a sizing area 1304, in which content appears to be sized in frames. Illustrative panels are shown 1306*a*-1306*n*, having been drawn by a user clicking and holding the arrow button in the bottom right corner of each panel and moving the arrow vertically, horizontally and/or diagonally until the desired panel size is obtained. The x-coordinates and y-coordinates of each panel are shown in each panel, as well as numeric order assigned to each panel (e.g., 1306*n* is designated as panel "2"). In the example, 1306*a* has been designated as a start panel. This designation may be made by a user or the content preparer 115 may designate the first panel drawn as the start panel by a default setting. It should be noted that the panels which are drawn using the content preparer 115 do not need to correspond to the size of the panels of the original content, as will be illustrated with reference to FIGS. 14 and 14*a-f*.

Figure 14:
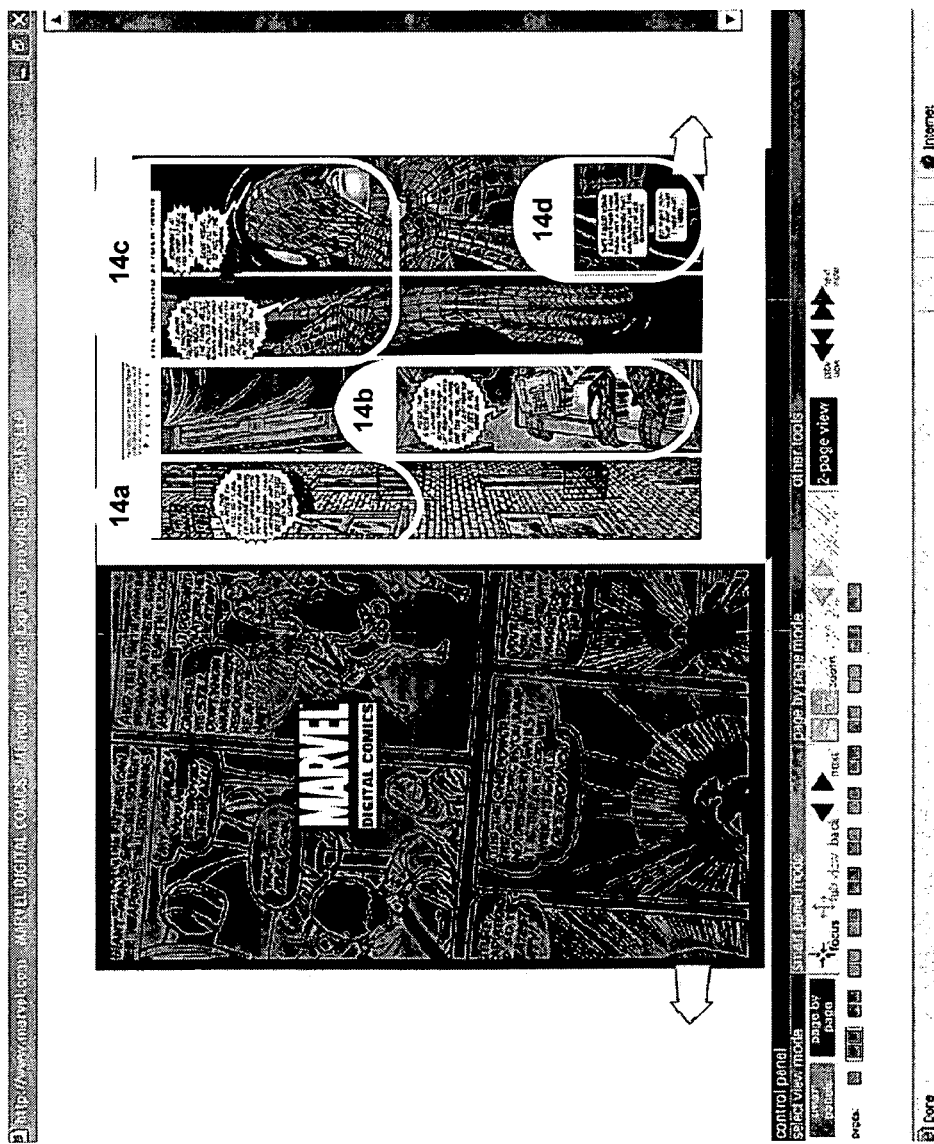
FIG. 14 illustrates a user interface for defining multiple enhanced areas according to an embodiment of the present invention.
Figure 14A:
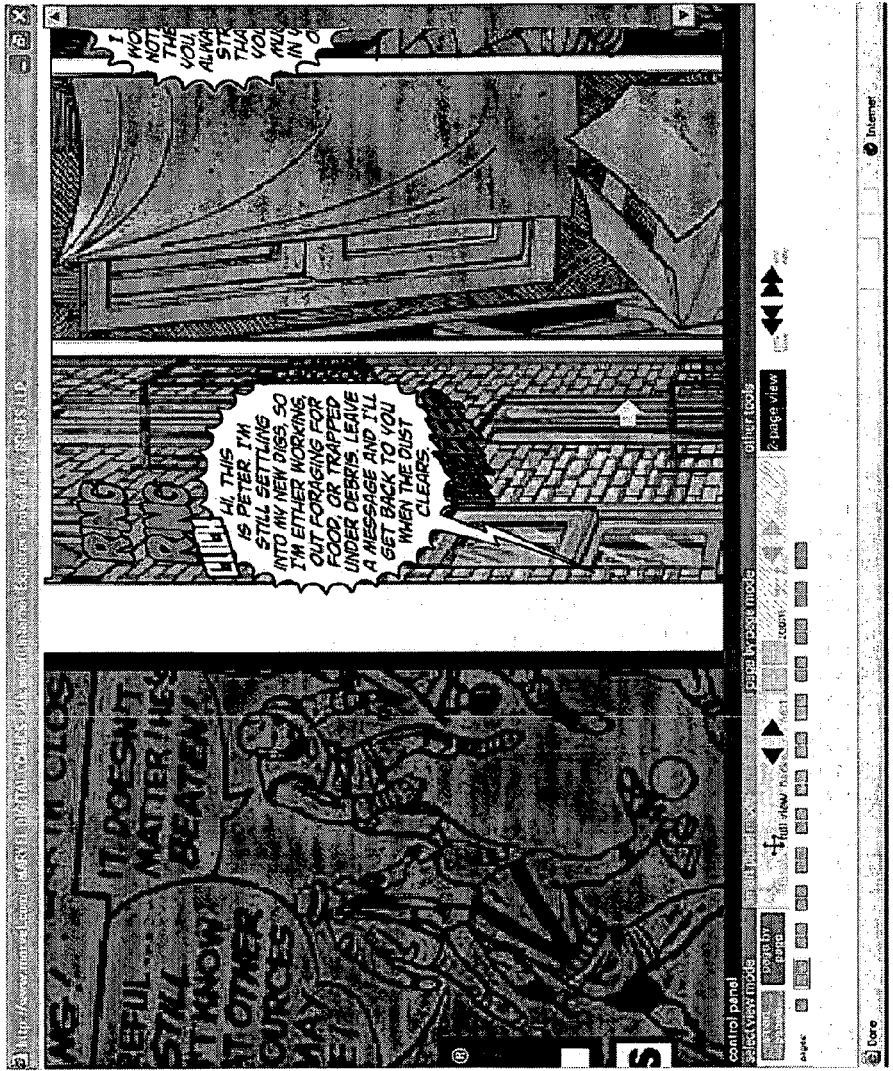
FIG. 14*a* illustrates a first enhanced view defined from the user interface of FIG. 14.
Figure 14B:
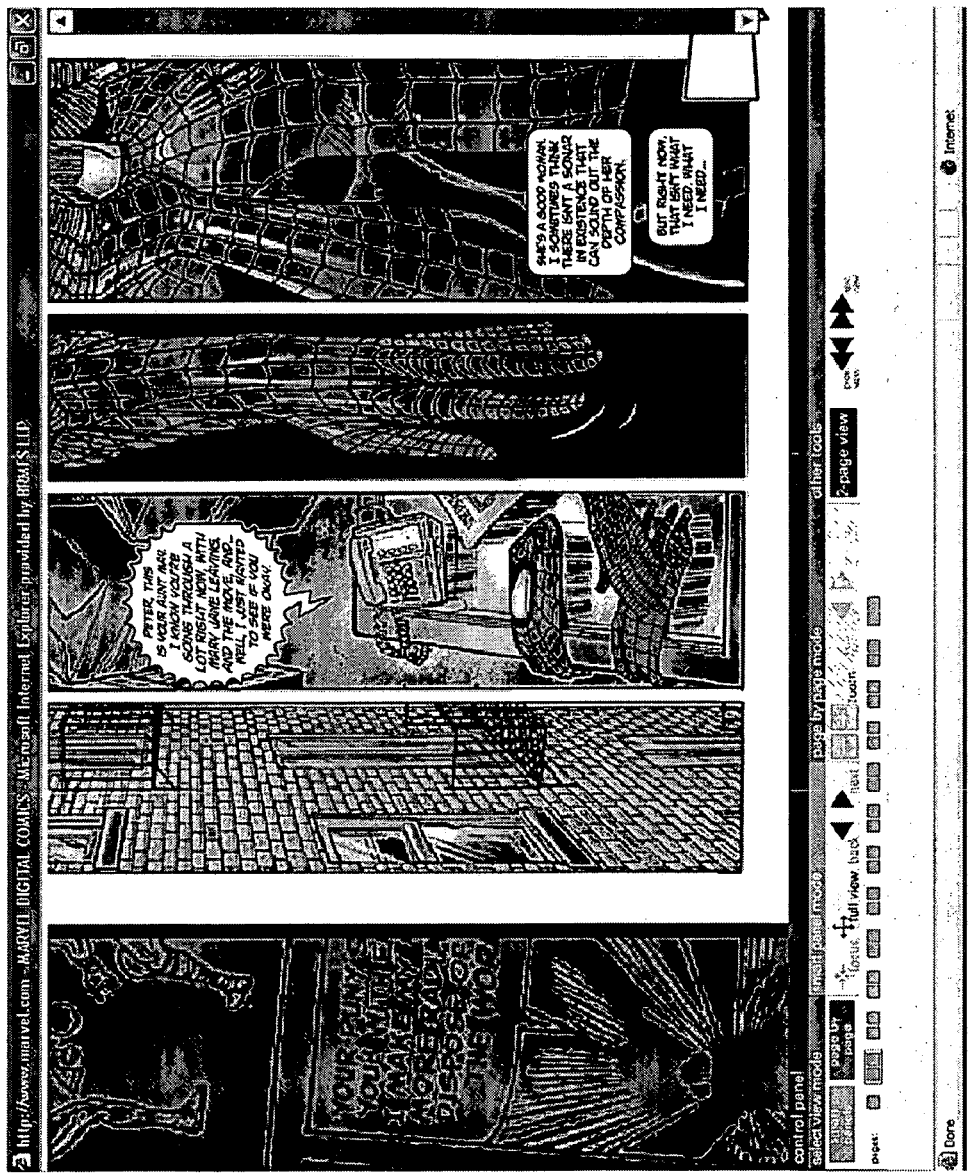
FIG. 14*b* illustrates a second enhanced view defined from the user interface of FIG. 14.
Figure 14C:
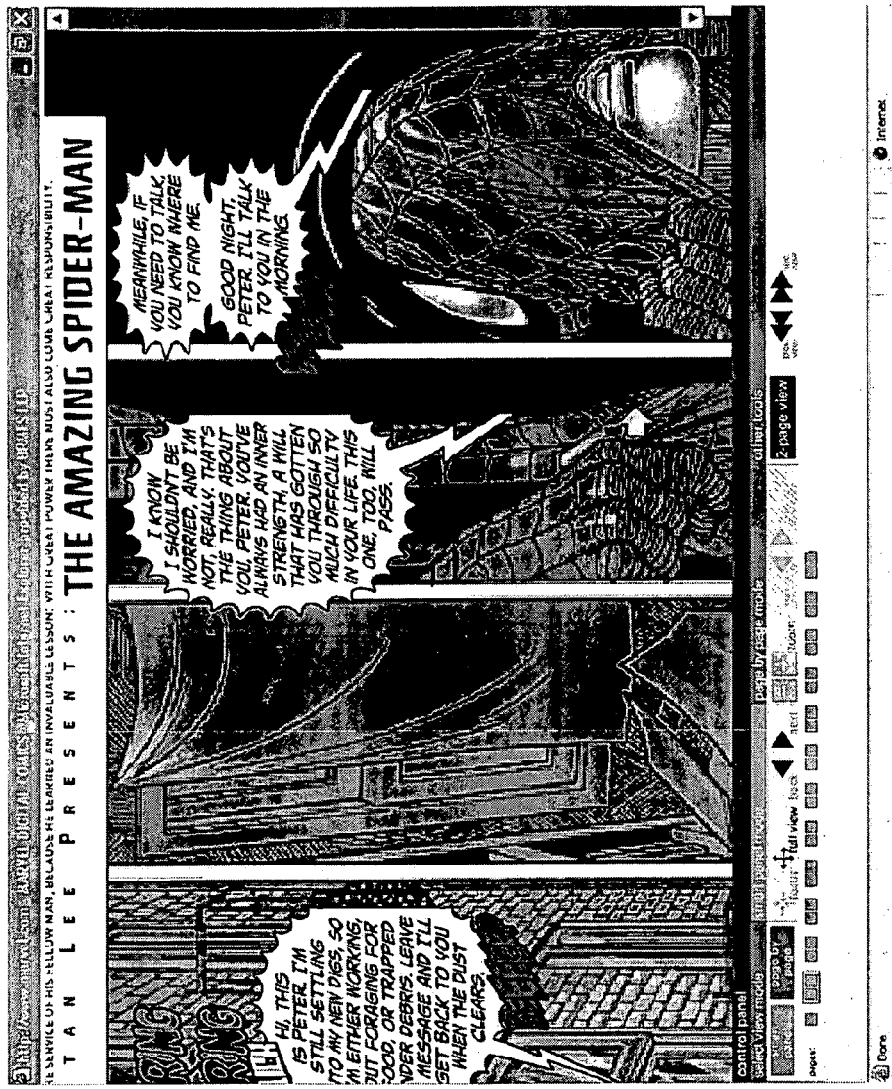
FIG. 14c illustrates a third enhanced view defined from the user interface of FIG. 14.
Figure 14D:
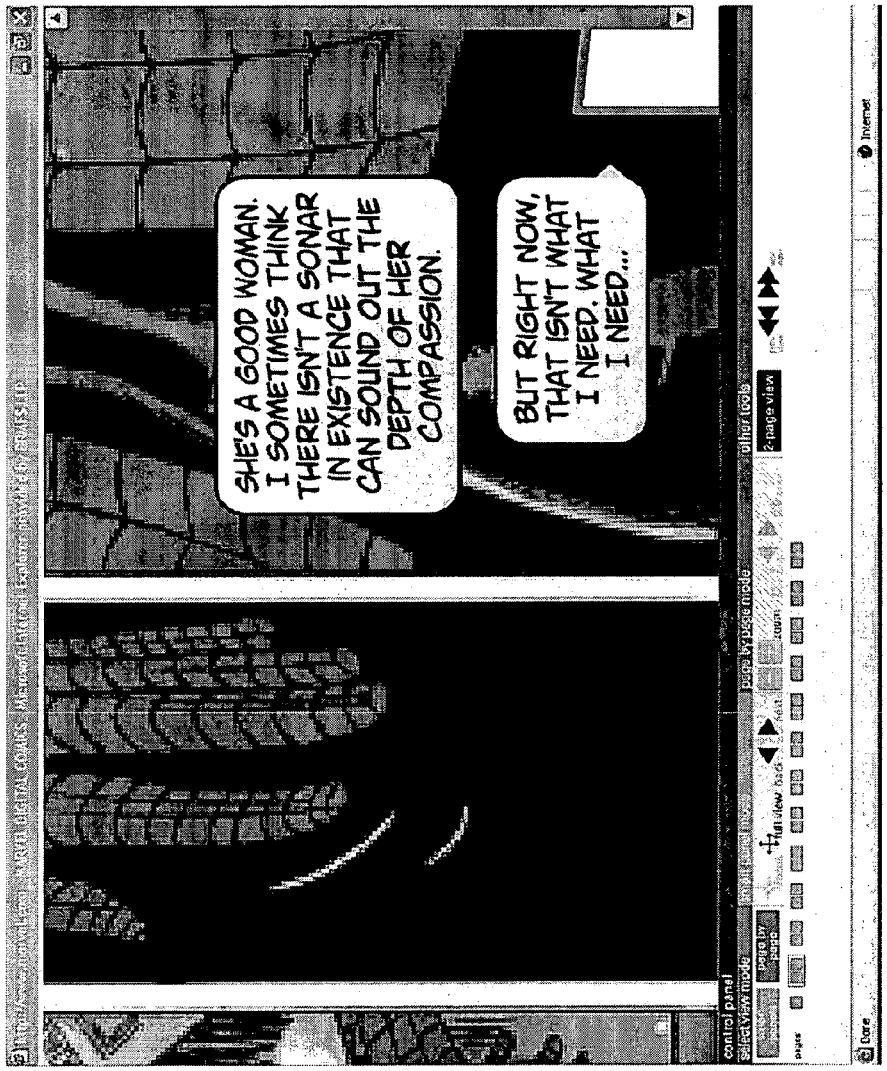
FIG. 14d illustrates a fourth enhanced view defined from the user interface of FIG. 14.
Figure 14E:
FIG. 14e illustrates a view spanning two pages of content.
Figure 14F:
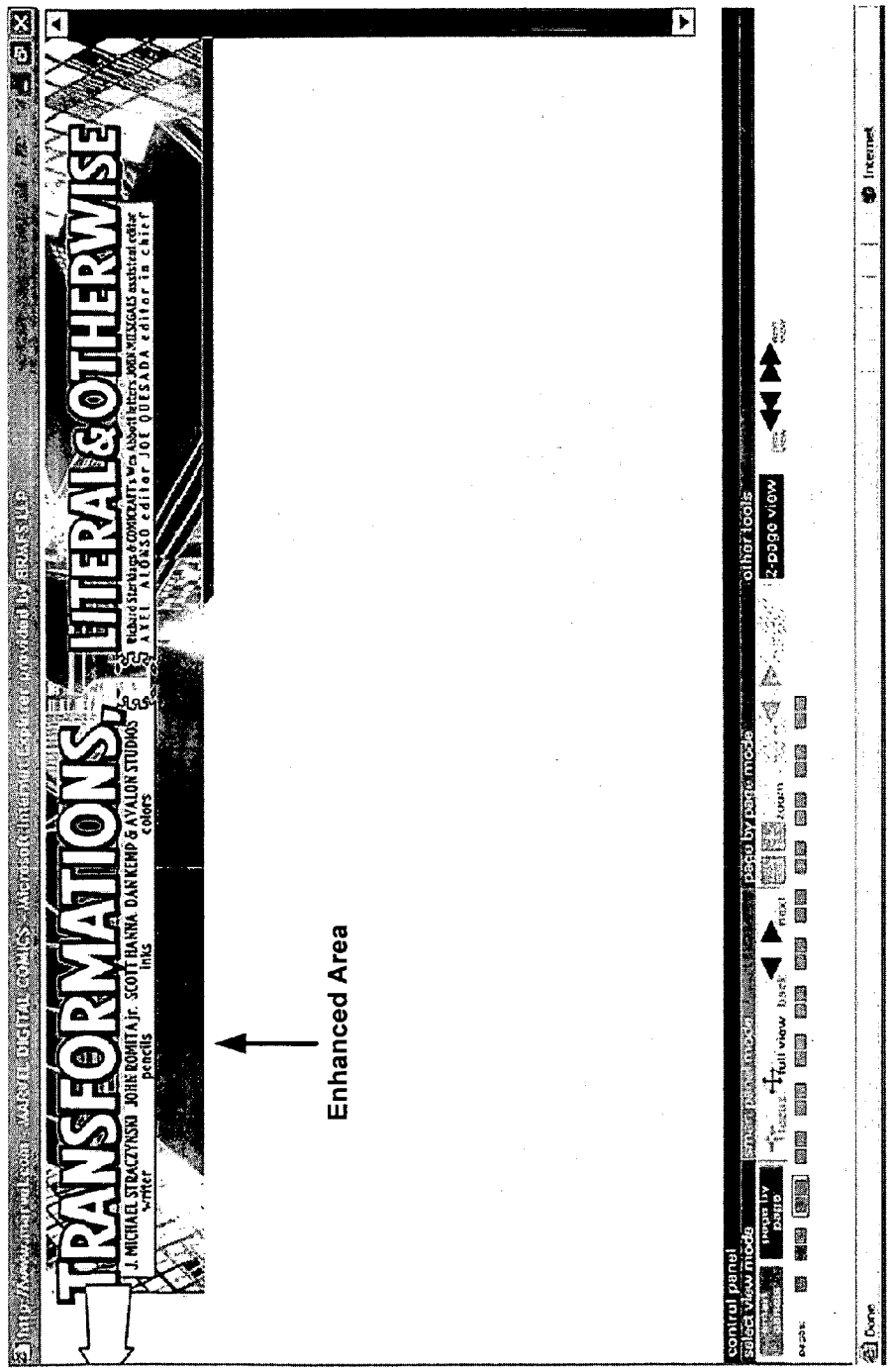
FIG. 14f illustrates an enhanced area of FIG. 14e.

FIG. 14 illustrates a user interface 1400 wherein a page of content is shown comprising multiple panels. In the page view mode there are four panels of content, vertically oriented with one or more text balloons in each panel. In the present example, the content preparer 115 was used to specify frames within each of the four vertical panels which frames do not correspond precisely to the size of the vertical panels. As shown with reference to FIGS. 14 and 14*a*-14*d*, the vertical panels in FIG. 14 contain frames of differing sizes. Each frame is shown in its enhanced view in FIGS. 14*a*-14*d*. FIG. 14*c* comprises an enhanced frame which spans portions of two comic book panels (shown in FIG. 14). FIG. 14*e* is an illustration of digitized content which spans two pages of original content and is not separated by panels in its page view form. FIG. 14*f* illustrates an enhanced view of a text portion of FIG. 14*e*, drawn without reference to any panels. As may be understood with reference to the foregoing figures, the present inventions permit a wide variation in frame sizing and shaping.

Referring again to FIG. 7, at step 710, the digital content server 102 and/or content preparer 115 determines if the selected area is the first area (e.g., enhanced area 1004) to be defined on the page. If the digital content server 102 detects that the selected area is the first, the digital content server 102 then determines if the selected area is the only area on the page, at step 712. If the area is not the only area of the page, the system administrator inputs a request to define the area as a start panel, at step 714. As discussed above, any other orienting designation may also or instead be defined at this point. In some embodiments, the display program 118*a*-118*n* will display the start panel area first when the user is navigating digital content using the enhanced view mode. At step 724, the system administrator saves the settings.

Returning to step 712, if the defined area is the only area of the content, the system administrator inputs a request to the digital content server 102 to define the area as both a start panel and an end panel, or in some embodiments with another designation, or alternatively, the content preparer 115 will identify the area as a solitary area without specific user input. After the area has been defined, the flow passes to step 724 so that the settings may be saved as discussed above.

Returning to step 710, if the defined area is not the first area of the page, control passes to step 718. At step 718, if the area is the last area of the page, the system administrator inputs a request to the digital content server 102 to define the area as an end panel at step 720. At step 718, if the area is not the last area of the page, the area is recorded as a successor panel (e.g., enhanced area 1006) at step 722. At step 724, the settings are saved, as discussed.

The system administrator may also input a request, at step 722, to lock each successor panel into a child-select mode. It is at this point that a child/parent link structure used by the display program 118*a*-118*n* is created. The child/parent link preserves the relationships between each frame (e.g., enhanced area 1004) and its parent content collection (e.g., page 1204). In embodiments having two or more enhanced areas per page, the system administrator may also input a request, at step 724, to order the defined areas sequentially and/or with the other orientation designations that may have been specified. The ordering may be implemented by designating each enhanced area with a number of an order of a sequence, or by designating the enhanced area with reference to other enhanced areas in the collection (e.g., panel[x-1], or panel[x-2], where x is a fixed or otherwise identifiable panel).

Figure 8:
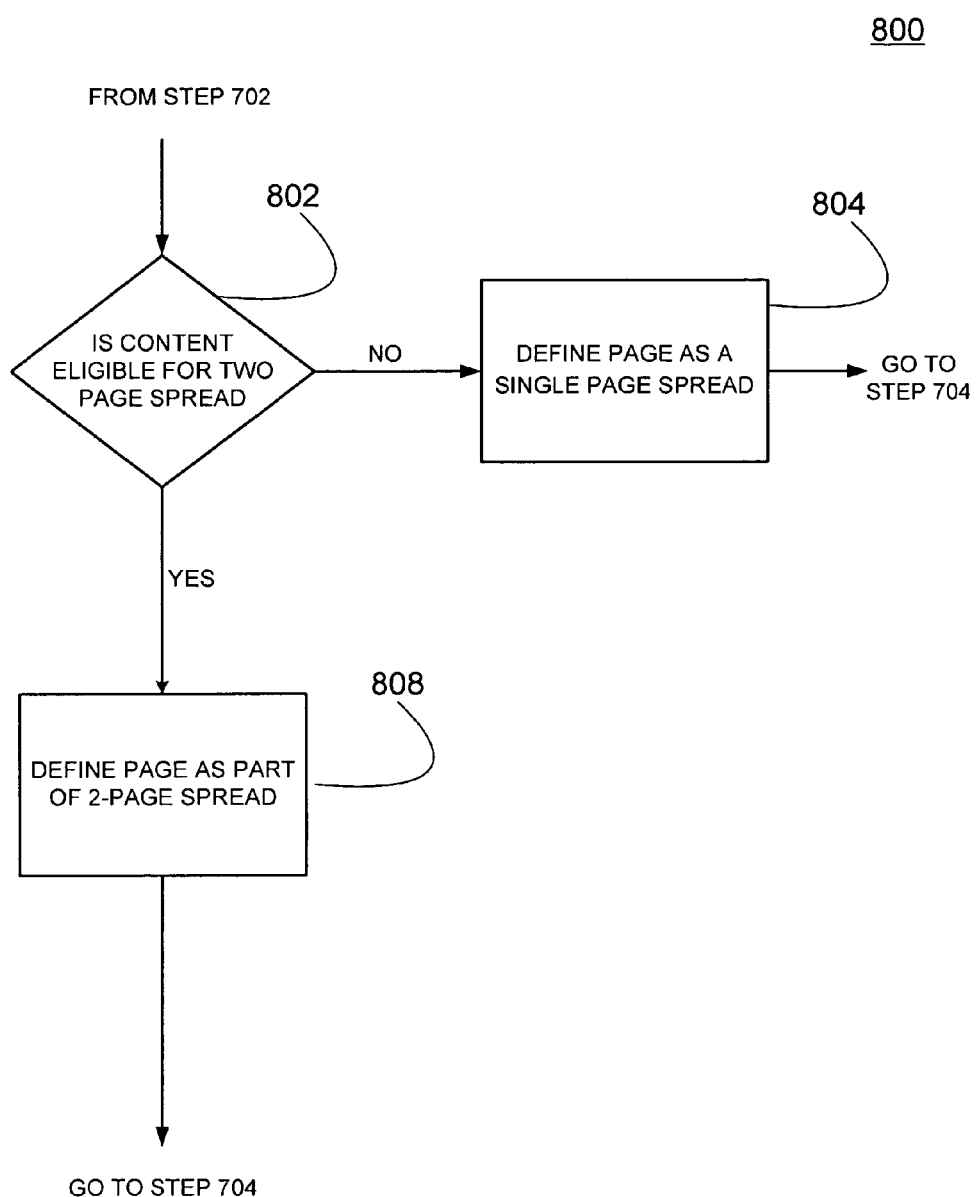
FIG. 8 illustrates a control flow for creating single-page and two-page digital content views according to an embodiment of the present invention.

Referring to FIG. 8, flowchart 800 illustrates a control flow for creating single-page and two-page views for execution in the page mode of the display program 118*a*-118*n*. At step 802, it is determined whether the content is eligible for a two-page spread. An example of a two-page view is shown in FIG. 12, which illustrates page 1202 and page 1204. Typically, each page of the comic is defined as being part of a two-page view except the first and last page of the comic.

As discussed above, a data structure can be created and saved at the content database 106 that specifies a double indicator parameter. The double indicator parameter designates whether a particular page is part of a two-page spread or is displayed as a single page within a comic. This parameter can be set by the system administrator. If the content is designated for a two page spread, the page is defined accordingly, at step 808. After the page has been defined, the flow passes to step 704.

If the content is not eligible for a two-page spread, the page is defined as a single-page spread accordingly, at step 804. After the page has been defined, the flow passes to step 704.

Figure 9:
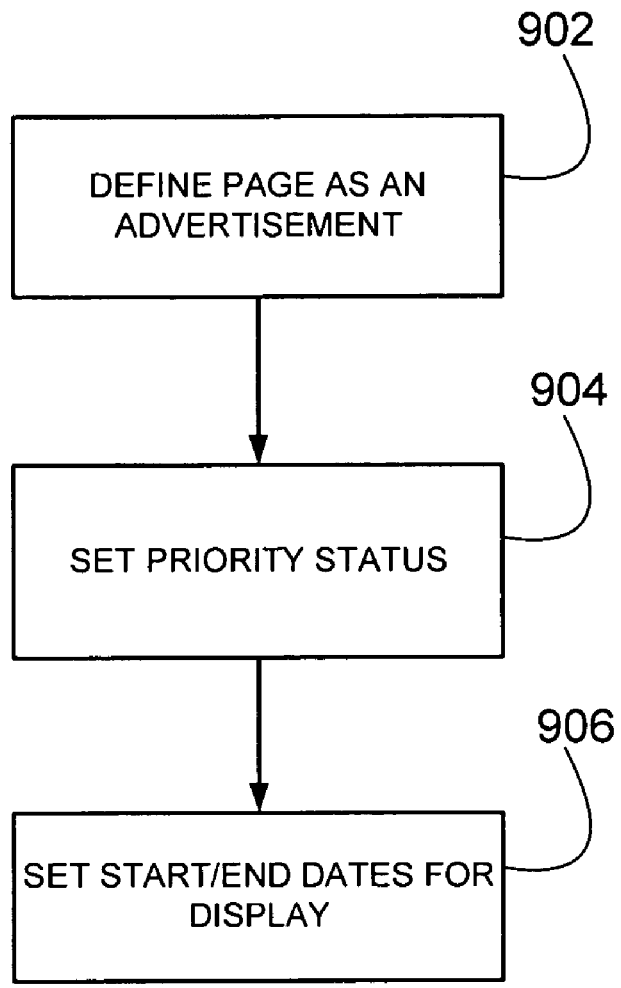
FIG. 9 illustrates a control flow for defining an advertisement according to an embodiment of the present invention.

Referring to FIG. 9, flowchart 900 illustrates a control flow for defining an advertisement according to an embodiment of the present invention. As described above, in some embodiments, advertisements for products and services from a comic provider or other parties are stored in the advertisement database 120 on the digital content server 102. At the advertisement database 120, an advertisement page is categorized in a data structure that includes an advertisement identifier, active designator, start date indicator, end date indicator, source file, advertisement count, advertisement link, and priority status. In one embodiment, advertisements are stored as graphical files that can be displayed through, for example, the viewer interface 400 in the same manner as the comic pages. Image files presented as advertisements can be a GIF, JPEG, or any other suitable file format that can be presented in a web browser or display interface.

Beginning at step 902, an object (e.g., a JPEG file) is designated as an advertisement by the digital content server 102. Next, the system administrator inputs a request to assign a value to the priority status for a given advertisement. The digital content server 102 receives the request and stores the value in the advertisement database 120, at step 904. The priority status determines the frequency with which the advertisement will be presented to the user. An advertisement assigned with a priority value of "1," for example, will be cycled less frequently than one assigned a priority value of "4." Any designation technique could be used (e.g., use of other characters with specified meanings, time specifications, etc.). If desired, the system administrator can specify a start date and an end date to define the date range for presentation of the advertisement. In some embodiments, the system administrator can also indicate where an advertisement will be placed. At step 906, the digital content server 102 receives the request and stores this record in the advertisement database 120. The digital content server 102 checks this record before forwarding the advertisement to the client 116a-116n. After the date parameters have been set, the advertisement is not presented outside of the defined date range.

The figures herein are conceptual illustrations allowing an explanation of the present invention. Other exemplary implementations of various aspects of the present invention are described in the Computer Program Listing Appendix attached hereto and incorporated by reference herein. It should be understood that various aspects of the embodiments of the present invention could be implemented in hardware, firmware, software, or a combination thereof. In such an embodiment, the various components and/or steps would be implemented in hardware, firmware, and/or software to perform the functions of the present invention. That is, the same piece of hardware, firmware, or module of software could perform one or more of the illustrated blocks (e.g., components or steps). Unless explicitly stated otherwise herein, the ordering or arrangement of the steps and/or components should not be limited to the descriptions and/or illustrations hereof.

In software implementations, computer software (e.g., programs or other instructions) and/or data is stored on one or more machine readable media as part of a computer program product, and is loaded into or written on a computer system or other device or machine via a removable storage drive, hard drive, or communications interface. The software described herein need not reside on the same or a singular medium in order to perform the inventions described herein. Computer software can be implemented by any programming or scripting languages, such as Java, Javascript, Action Script, or the like. Computer programs (also called computer control logic or computer readable program code) are stored in a various memory types, including main and/or secondary memory, and executed by one or more processors (controllers, or the like) to cause the one or more processors to perform the functions of the invention as described herein. In this document, the terms machine readable medium, computer program medium and computer usable medium are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, or the like); or the like.

Notably, the figures and examples above are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). Moreover, it is not intended for any term in the specification or claims to be ascribed an uncommon or special meaning unless explicitly set forth as such. Further, the present invention encompasses present and future known equivalents to the known components referred to herein by way of illustration. While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computerized method for automatically navigating a sequence of illustrative scenes within a digital production distributed from a content server to one or more clients over a communications network or accessible from a storage medium coupled to one of the one or more clients, wherein the digital production includes a plurality of panels with at least one panel displaying two or more of the illustrative scenes, the method comprising:

accessing a navigation control program distributed from a remote source to a first client of the one or more clients, the navigation control program being operable to automate selection and display of the sequence of illustrative scenes;

launching the navigation control program at the first client to access instructions for displaying the sequence of illustrative scenes in a specified order and to access dimension data and scale parameters that are processed to automatically display each illustrative scene with a visual enhancement that makes each displayed illustrative scene more readily perceived than an adjacent illustrative scene within the specified order, wherein the dimension data are specified by a user of a content preparation system and the specified order is specified by the content preparation system;

receiving a user request to select either a first viewing mode or a second viewing mode;

in response to the user request to select the first viewing mode, displaying a first page of the digital production so that the first page is visible in its entirety on a display screen without visually distinguishing panels on the first page from one another; and in response to the user request to select the second viewing mode, displaying each of the sequence of illustrative scenes with visual enhancement that makes each displayed illustrative scene more readily perceived than an adjacent illustrative scene within the specified order, wherein dimensions of each displayed illustrative scene are independent of dimensions of each of the panels within the digital production.

2. The method of claim 1, further comprises identifying a first panel that includes a plurality of characters engaging in a plurality of activities, the dimension data defining a first illustrative scene to display a first subset of the activities from the first panel, and the dimension data defining a second illustrative scene to display a second subset of the activities from the first panel.

3. The method of claim 1, further comprises identifying a first panel that includes a plurality of balloons comprising words or thoughts of one or more characters, the dimension data defining a first illustrative scene to display a first subset of the balloons from the first panel, and the dimension data defining a second illustrative scene to display a second subset of the balloons from the first panel.

4. The method of claim 1 wherein the digital production comprises a digitized comic book.

5. The method of claim 1 including, in response to the user request to select the second viewing mode, displaying each of the sequence of illustrative scenes in an enlarged state compared to an adjacent illustrative scene within the specified order.

6. A system for automatically navigating a sequence of illustrative scenes within a digital production. the system comprising:

a digital content server storing the digital production, wherein the digital production includes a plurality of panels with at least one panel displaying two or more of the illustrative scenes;

a client computing device;

a display screen coupled to the client computing device; and a communications network;

wherein the client computing device is operable to launch a navigation control program distributed from the digital content server over the communications network, the navigation control program being operable to automate selection and display of the sequence of illustrative scenes and operable to perform operations including:

accessing instructions for displaying the sequence of illustrative scenes on the display screen in a specified order and to access dimension data and scale parameters that are processed to automatically display each illustrative scene on the display screen with a visual enhancement that makes each displayed illustrative scene more readily perceived than an adjacent illustrative scene within the specified order, wherein the dimension data are specified by a user of a content preparation system and the specified order is specified by the content preparation system;

in response to a user request to select a first viewing mode, displaying a first page of the digital production on the display screen so that the first page is visible in its entirety on the display screen without visually distinguishing panels on the first page from one another; and in response to a user request to select a second viewing mode, displaying each of the sequence of illustrative scenes on the display screen with visual enhancement that makes each displayed illustrative scene more readily perceived than an adjacent illustrative scene within the specified order, wherein dimensions of each displayed illustrative scene are independent of dimensions of each of the panels within the digital production.

7. The system of claim 6 wherein the digital production comprises a digitized comic book.

8. The system of claim 6 wherein the navigation control program further is operable, in response to the user request to select the second viewing mode, to display on the display screen each of the sequence of illustrative scenes in an enlarged state compared to an adjacent illustrative scene within the specified order.

9. A system for automatically navigating a sequence of illustrative scenes within a digital production, the system comprising:

a client computing device;

a storage medium coupled to the client computing device and storing the digital production, wherein the digital production includes a plurality of panels with at least one panel displaying two or more of the illustrative scenes; and a display screen coupled to the client computing device, wherein the client computing device is operable to launch a navigation control program that is operable to automate selection and display of the sequence of illustrative scenes and operable to perform operations including:

accessing instructions for displaying the sequence of illustrative scenes on the display screen in a specified order and to access dimension data and scale parameters that are processed to automatically display each illustrative scene on the display screen with a visual enhancement that makes each displayed illustrative scene more readily perceived than an adjacent illustrative scene within the specified order, wherein the dimension data are specified by a user of a content preparation system and the specified order is specified by the content preparation system;

in response to a user request to select a first viewing mode, displaying a first page of the digital production on the display screen so that the first page is visible in its entirety on the display screen without visually distinguishing panels on the first page from one another; and in response to a user request to select a second viewing mode, displaying each of the sequence of illustrative scenes on the display screen with visual enhancement that makes each displayed illustrative scene more readily perceived than an adjacent illustrative scene within the specified order, wherein dimensions of each displayed illustrative scene are independent of dimensions of each of the panels within the digital production.

10. The system of claim 9 wherein the digital production comprises a digitized comic book.

11. The system of claim 9 wherein the navigation control program further is operable, in response to the user request to select the second viewing mode, to display on the display screen each of the sequence of illustrative scenes in an enlarged state compared to an adjacent illustrative scene within the specified order.

* * * * *

UNITED STATES PATENT AND TRADEMARK OFFICE
CERTIFICATE OF CORRECTION

| | |
|---|---|
| PATENT NO. | : 8,301,999 B2 |
| APPLICATION NO. | : 11/527095 |
| DATED | : October 30, 2012 |
| INVENTOR(S) | : Peter Jonathan Olson |

It is certified that error appears in the above-identified patent and that said Letters Patent is hereby corrected as shown below:

Column 21, Line 52, In Claim 6, delete "production." and insert --production,--.

Signed and Sealed this
Twelfth Day of March, 2013

Teresa Stanek Rea
*Acting Director of the United States Patent and Trademark Office*